(12) United States Patent
Osterman et al.

(10) Patent No.: US 10,012,884 B2
(45) Date of Patent: Jul. 3, 2018

(54) HIGH CONTRAST ELECTRO-OPTIC LIQUID CRYSTAL CAMERA IRIS PROVIDING ANGLE INDEPENDENT TRANSMISSION FOR UNIFORM GRAY SHADES

(71) Applicant: LC-TEC Displays AB, Borlänge (SE)

(72) Inventors: Jesper Osterman, Falun (SE); Terry J. Scheffer, Hilo, HI (US)

(73) Assignee: LC-TEC Displays AB, Borlange (SE)

( * ) Notice: Subject to any disclaimer, the term of this patent is extended or adjusted under 35 U.S.C. 154(b) by 170 days.

(21) Appl. No.: 15/024,303

(22) PCT Filed: Sep. 19, 2014

(86) PCT No.: PCT/US2014/056553
§ 371 (c)(1),
(2) Date: Mar. 24, 2016

(87) PCT Pub. No.: WO2015/042395
PCT Pub. Date: Mar. 26, 2015

(65) Prior Publication Data
US 2016/0238869 A1 Aug. 18, 2016

Related U.S. Application Data

(63) Continuation-in-part of application No. 14/034,283, filed on Sep. 23, 2013, now Pat. No. 8,891,042.
(Continued)

(51) Int. Cl.
*G02F 1/1347* (2006.01)
*G02F 1/139* (2006.01)
(Continued)

(52) U.S. Cl.
CPC .......... *G02F 1/1393* (2013.01); *G02B 5/005* (2013.01); *G02B 13/0075* (2013.01);
(Continued)

(58) Field of Classification Search
CPC ...... G02B 5/005; G02B 13/0075; G03B 9/02; G03B 7/095; G02F 1/1393;
(Continued)

(56) References Cited

U.S. PATENT DOCUMENTS 4,774,537 A 9/1988 Moody
4,884,876 A 12/1989 Lipton et al.
(Continued)

FOREIGN PATENT DOCUMENTS

EP 0 121 305 A2 10/1984
EP 1001619 A1 5/2000
(Continued)

*Primary Examiner* — Charles Chang
(74) *Attorney, Agent, or Firm* — Stoel Rives LLP

(57) ABSTRACT

A high-contrast electro-optic liquid crystal camera iris (10) provides angle independent transmission for uniform gray shades. The liquid crystal iris comprises a combination of first and second liquid crystal devices (12, 14) arranged in optical series and positioned between optical polarizers (46, 48). The director field (18) of the second liquid crystal device is a mirror image of the director field (16) of the first liquid crystal device, and the first and second liquid crystal devices are placed together so that the azimuthal directions (42) of the surface-contacting directors (18c, 22c) are in parallel alignment at the adjoining or confronting surfaces of the substrates (242, 321) of the first and second liquid crystal devices. The liquid crystal iris provides, therefore, less angular variation of intermediate transmittances compared with that provided by prior art liquid crystal irises.

11 Claims, 21 Drawing Sheets

Related U.S. Application Data

(60) Provisional application No. 61/976,408, filed on Apr. 7, 2014.

(51) Int. Cl.
| | | |
|---|---|---|
| *G03B 7/095* | (2006.01) | |
| *G02F 1/1335* | (2006.01) | |
| *G02F 1/1343* | (2006.01) | |
| *G02F 1/1337* | (2006.01) | |
| *G02B 13/00* | (2006.01) | |
| *G02B 5/00* | (2006.01) | |
| *G03B 9/02* | (2006.01) | |
| *H04N 5/225* | (2006.01) | |
| *H04N 5/238* | (2006.01) | |

(52) U.S. Cl.
CPC ........ *G02F 1/1337* (2013.01); *G02F 1/13471* (2013.01); *G02F 1/13475* (2013.01); *G02F 1/133528* (2013.01); *G02F 1/134309* (2013.01); *G03B 7/095* (2013.01); *G03B 9/02* (2013.01); *H04N 5/2254* (2013.01); *H04N 5/238* (2013.01); *G02F 2001/133531* (2013.01)

(58) Field of Classification Search
CPC ........... G02F 1/133528; G02F 1/13471; G02F 1/134309; G02F 1/13475; G02F 2001/133531; G02F 1/1337; H04N 5/2254; H04N 5/238
USPC ......................................................... 349/74
See application file for complete search history.

(56) References Cited

U.S. PATENT DOCUMENTS

| | | |
|---|---|---|
| 5,047,847 A | 9/1991 | Toda et al. |
| 5,071,229 A | 12/1991 | Oaki et al. |
| 5,105,289 A | 4/1992 | Sonehara et al. |
| 6,147,740 A | 11/2000 | Yoshida et al. |
| 7,508,566 B2 | 3/2009 | Feenstra et al. |
| 7,859,741 B2 | 12/2010 | Chikazawa et al. |
| 8,891,042 B1 | 11/2014 | Osterman et al. |
| 2004/0036821 A1 | 2/2004 | Paukshto et al. |
| 2005/0195313 A1 | 9/2005 | Tsuji et al. |
| 2006/0115606 A1 | 6/2006 | Ichinose et al. |
| 2006/0291053 A1 | 12/2006 | Robinson et al. |
| 2008/0084498 A1 | 4/2008 | He et al. |
| 2008/0123025 A1 | 5/2008 | Li et al. |
| 2009/0033863 A1 | 2/2009 | Blum et al. |
| 2009/0169192 A1 | 7/2009 | Yang et al. |
| 2011/0090415 A1 | 4/2011 | Asatryan et al. |
| 2012/0002140 A1* | 1/2012 | Hatoyama ............ G02F 1/1337 349/76 |
| 2012/0044431 A1 | 2/2012 | Osterman et al. |
| 2012/0242924 A1 | 9/2012 | Galstian |

FOREIGN PATENT DOCUMENTS

| | | |
|---|---|---|
| JP | H072/18975 A | 8/1995 |
| JP | 2012-32614 A | 2/2012 |
| WO | WO 02/071136 A2 | 9/2002 |

* cited by examiner prior art twisted nematic (TN) liquid crystal iris iso-transmitted luminance polar contour diagram for
prior art twisted nematic (TN) liquid crystal iris prior art dual-cell, guest-host liquid crystal iris iso-transmitted luminance polar contour diagram for
prior art dual-cell, guest-host liquid crystal iris

HIGH CONTRAST ELECTRO-OPTIC LIQUID CRYSTAL CAMERA IRIS PROVIDING ANGLE INDEPENDENT TRANSMISSION FOR UNIFORM GRAY SHADES

COPYRIGHT NOTICE

© 2014 LC-TEC Displays AB.

A portion of the disclosure of this patent document contains material that is subject to copyright protection. The copyright owner has no objection to the facsimile reproduction by anyone of the patent document or the patent disclosure, as it appears in the Parent and Trademark Office patent file or records, but otherwise reserves all copyright rights whatsoever. 37 CFR § 1.71(d).

TECHNICAL FIELD

This disclosure relates to a liquid crystal iris for an image recording device such as a camera and, in particular, for a miniature camera of a type installed in a smart phone.

BACKGROUND INFORMATION

A conventional camera uses a mechanical iris diaphragm to control the amount of light reaching the recording medium, such as film or a charge-coupled device (CCD) light sensor array. The mechanical iris is complex device that is ill-suited for many miniature camera applications, such as those found in smart phones and other hand-held devices. Many electro-optical alternatives to the mechanical iris have been proposed such as the guest-host liquid crystal display (U.S. Pat. No. 4,774,537 and U.S. Patent Application Pub. No. US 2012/0242924), twisted nematic (TN) liquid crystal display (U.S. Patent Application Pub. No. US 2008/0084498), electrophoretic display (U.S. Pat. No. 7,859,741), digital micro-mirror display (European Patent Application No. EP1001619 A1), and electrowetting display (U.S. Pat. No. 7,508,566). All of these alternatives can control the amount of light admitted to the recording medium, and if the electrode structures are patterned in an arrangement of concentric rings to enable changing the aperture, these alternative approaches can also adjust the depth of field. Such a patterned ring arrangement of electrode structures is described in detail, for example, in U.S. Patent Application Pub. No. US 2008/0084498.

Using liquid crystals for an electro-optical iris is particularly attractive since liquid crystal devices (LCDs) are a mature mainstream technology. As with the mechanical iris, to control light effectively, the liquid crystal iris must be capable of providing not only a high contrast ratio, but also a uniform transmittance at intermediate gray levels over the range of light input angles that are typically found in miniature camera optics. Angular dependence of the transmittance of the iris would cause a nonuniform exposure over the light-sensitive area of the recording medium. Prior art liquid crystal iris designs do not satisfy these requirements, which shortcomings are reasons why liquid crystal irises have not yet found widespread commercial application.

Simulations show that a TN device used as a camera iris, as proposed in U.S. Patent Application Pub. No. US 2008/0084498, provides a very high contrast ratio, but the transmittance at intermediate gray levels is appreciably nonuniform over a range of angles of incident light. FIG. 1 shows a simulated electro-optic curve of a prior art TN iris device under conditions of normally incident white light. This curve is simulated by use of Display Modeling System (DIMOS) software available from Autronic-Melchers GmbH, Karlsruhe, Germany, for the liquid crystal mixture MLC-7030 available from Merck GmbH, Darmstadt, Germany. MLC-7030 has a positive dielectric constant anisotropy of 3.8 and a birefringence of $\Delta n=0.1126$ at the 550 nm design wavelength. The cell gap is chosen as 4.23 µm to satisfy the "first minimum" condition $\Delta n \cdot d/\lambda=0.866$ to provide maximum throughput at the design wavelength. Using the data of FIG. 1, the normalized transmitted luminance is 50% at 2.81V, and the normalized transmitted luminance is 0.1% at 5.25V, resulting in a contrast ratio of 1,000.

FIG. 2 shows, for this simulation, the angular variation of the normalized transmitted luminance of the prior art TN iris under application of a drive voltage of 2.81V for 50% transmitted luminance at normal incidence. These data are conveniently presented by an iso-transmitted luminance polar contour diagram, in which the contours are lines of constant normalized transmitted luminance. The center of the diagram represents normal incidence, where the normalized transmitted luminance is 50% and the periphery of the diagram represents incident light at the polar angle of 40°. The azimuthal angle of the incident light is represented in the circular direction from 0° to 360°. FIG. 2 shows that the normalized transmitted luminance varies from about 9% to about 82% over incident angles extending out to 20°. Although this TN device can achieve a high contrast ratio, the strong angular variation of intermediate transmittances of this TN device makes it unsatisfactory for use as a camera iris.

The prior art dual-cell guest-host iris represented in FIGS. 6A and 6B of U.S. Patent Application Pub. No. US 2012/0242924, consists of two homogeneously aligned guest-host cells placed in optical series and oriented with their surface alignment directions at 90°. FIG. 3 shows a simulated electro-optic curve for this prior art iris with 5 µm cell gaps filled with the liquid crystal mixture MLC-7030, to which is added an achromatic organic dye mixture with a dichroic ratio of 6.2, Simulations show that, even at 12V, the contrast ratio reaches only 4.1. FIG. 4 shows a simulated iso-transmitted luminance polar contour diagram of the normalized transmitted luminance under application of 3.1V for 50% normalized transmitted luminance at normal incidence. In FIG. 4, the normalized transmitted luminance varies from about 42% to 60% over a range of incident angles extending out to polar angles of 20°. FIG. 4 exhibits somewhat less angular variation of intermediate transmittances compared with the angular variation of the TN iris simulated in FIG. 2, but the low contrast ratio of the dual-cell guest-host iris makes it unsatisfactory for use as a camera iris.

SUMMARY OF THE DISCLOSURE

The disclosed liquid crystal electro-optic iris overcomes the shortfalls of prior art liquid crystal irises by providing a high contrast ratio with little angular variation of intermediate transmitted luminances. The disclosed liquid crystal iris comprises a combination of first and second liquid crystal cells or devices arranged in optical series and positioned between optical polarizers. The director field of the second liquid crystal device is a mirror image of the director field of the first liquid crystal device, and the two liquid crystal devices are placed together so that the azimuthal directions of the surface-contacting directors are in parallel alignment at the adjoining or confronting surfaces of the substrates of the two liquid crystal devices. This arrangement of the first and second liquid crystal devices is notably different from that of prior art dual-cell assemblies, in which the azimuthal directions of the surface-contacting directors of the adjacent substrates are in orthogonal alignment to each other.

A qualitative explanation for the above-described arrangement of the first and second liquid crystal devices of the present invention is as follows. For example, in the first liquid crystal device, intermediate transmitted luminances can exhibit considerable angular variation when the propagation direction of the light in the liquid crystal layer is approximately along the direction of the tilted director located in the middle of the liquid crystal layer. But, as the light passes through the second liquid crystal device, the angular variation of the combined transmittance is dramatically reduced because the tilted director located in the middle of the second liquid crystal layer is more broadside to the light propagation direction. Placing the two liquid crystal devices together in the arrangement described results, therefore, in light that passes through the first liquid crystal device in a "bad" direction and passes through the second liquid crystal device in a "good" direction, and vice versa. The disclosed dual-cell liquid crystal iris provides, therefore, less angular variation of intermediate transmittances compared with that provided by prior art liquid crystal irises.

In a first embodiment, the liquid crystal devices are non-twisted, electrically controlled birefringence (ECB) cells, in which the nematic liquid crystal can be of a type with positive dielectric constant anisotropy or with negative dielectric constant anisotropy. For the case of positive dielectric anisotropy, the surface-contacting directors make small pretilt angles from the plane of the liquid crystal layer (homogeneous alignment) and, for the case of negative dielectric anisotropy, the surface-contacting directors make small pretilt angles from the direction of the normal to the liquid crystal layer (quasi-homeotropic alignment). The cell gap of each liquid crystal device is chosen to provide a continuous, voltage-dependent phase shift change up to 90° between the ordinary and extraordinary polarization components of light passing through the device. The desired phase shift change is accomplished by placing the two liquid crystal devices together so that the azimuthal directions of the surface-contacting directors of the adjoining or confronting surfaces of the substrates of the two liquid crystal devices are in parallel alignment. The 90° phase shift change imparted by each of the liquid crystal devices adds up to a 180° phase shift change for the combination, which is equivalent to a 90° rotation of linearly polarized light to provide maximum light transmittance when the first and second liquid crystal devices are placed between orthogonally aligned polarizers.

In a second embodiment, the liquid crystal has a positive dielectric anisotropy, and the liquid crystal layer twist angles of the two liquid crystal devices are substantially 60° but of opposite twist sense because the director field of the second liquid crystal device is a mirror image of the director field of the first liquid crystal device. Furthermore, in this second embodiment, the product of the cell gap, d, times the birefringence of the liquid crystal, $\Delta n$, is approximately given by the formula $\Delta n \cdot d/\lambda = 0.629$, where $\lambda$ is the design wavelength. The two liquid crystal devices are placed together so that the azimuthal directions of the surface-contacting directors of the adjoining or confronting surfaces of the substrates of the two liquid crystal devices are in parallel alignment. In this second embodiment, the input polarization direction is set to approximately bisect the angular distance between azimuthal directions of the surface-contacting directors at the inner substrate surfaces of the first liquid crystal device.

When no voltage is applied to the liquid crystal devices of the second embodiment, the light exiting the first liquid crystal device is circularly polarized at the design wavelength and the light exiting the second liquid crystal device is linearly polarized, but rotated by 90° from the input linear polarization direction. When the liquid crystal devices of this arrangement are activated with optimum high drive voltage, the light exiling the first liquid crystal device is linearly polarized and the light exiting the second liquid crystal device is linearly polarized in the same direction as the input linear polarization direction. Placing the second embodiment between orthogonally aligned polarizers provides maximum light transmittance when no voltage is applied to the first and second liquid crystal devices and essentially zero transmittance when a high voltage is applied to the first and second liquid crystal devices, thereby assuring maximum throughput and a high contrast ratio. Intermediate gray levels are obtained by applying voltages intermediate between 0V and the high drive voltage.

In a third embodiment, the liquid crystal has a positive dielectric anisotropy, and the liquid crystal layer twist angles of the two liquid crystal devices are substantially 90° but of opposite twist sense because the director field of the second liquid crystal device is a mirror image of the director field of the first liquid crystal device. Furthermore, in this third embodiment the product of the cell gap, d, times the birefringence of the liquid crystal, $\Delta n$, is approximately given by the formula $\Delta n \cdot d/\lambda = 0.447$, where $\lambda$ is the design wavelength. The two liquid crystal devices are placed together so that the azimuthal directions of the surface-contacting directors of the adjoining or confronting surfaces of the substrates of the two liquid crystal devices are in parallel alignment. In this third embodiment, the input polarization direction is set to approximately 20° with respect to the azimuthal direction of the surface-contacting directors at the input surface of the first liquid crystal device.

Additional aspects and advantages will be apparent from the following detailed description of preferred embodiments, which proceeds with reference to the accompanying drawings.

DETAILED DESCRIPTION OF PREFERRED EMBODIMENTS

Figure 5:
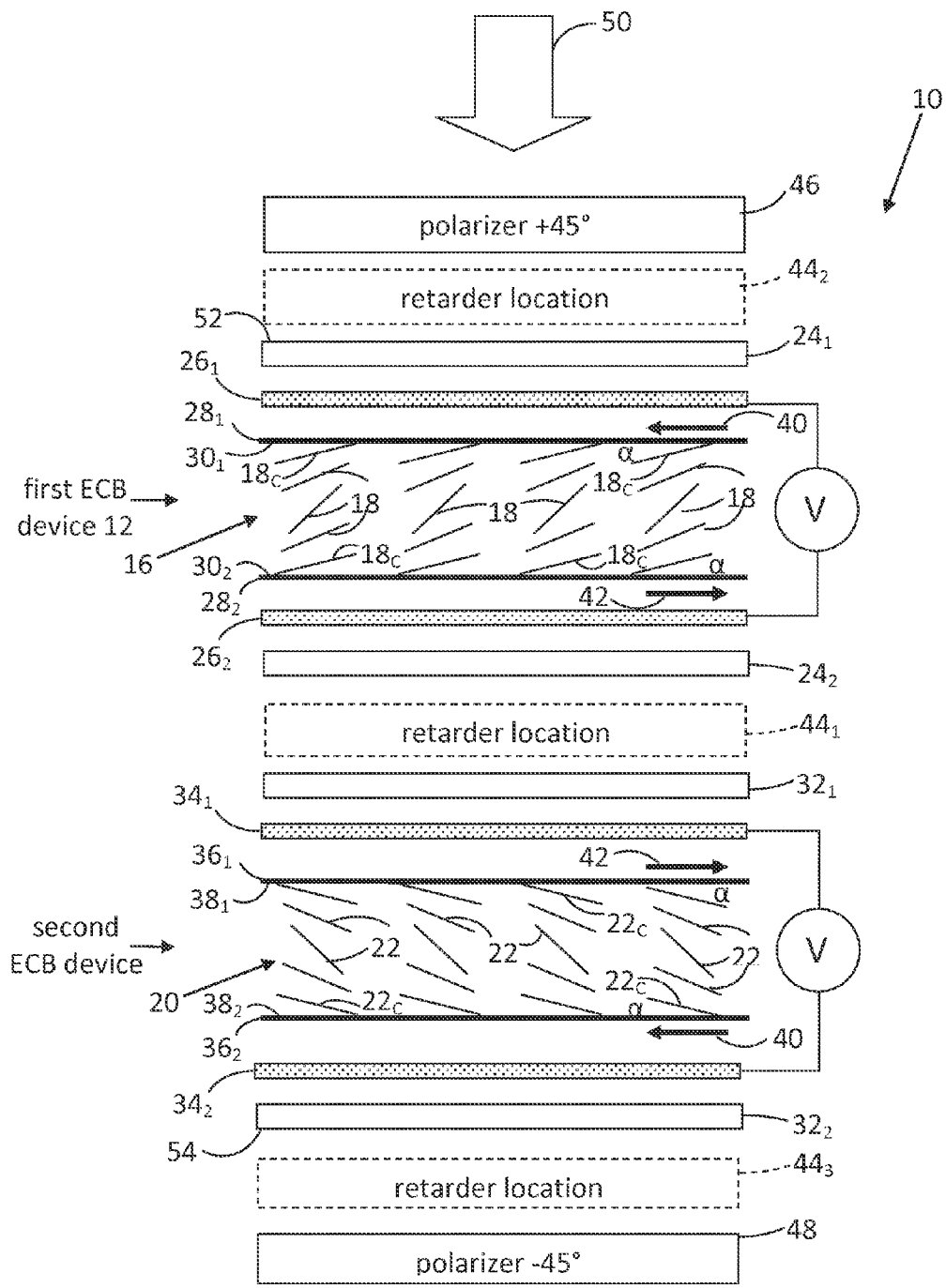
FIG. 5 is a diagrammatic exploded view of a first implementation of a first embodiment of the disclosed electro-optic liquid crystal camera iris comprising first and second homogeneously aligned ECB devices, in which the director field of the second liquid crystal device is a mirror image of the director field of the first liquid crystal device, and in which the first and second liquid crystal devices are placed together so that the azimuthal directions of the surface-contacting directors of the adjoining or confronting surfaces of the substrates of the two liquid crystal devices are in parallel alignment.

FIG. 5 is a simplified diagram of a liquid crystal iris 10 configured as a first implementation of a first embodiment of the disclosed electro-optic liquid crystal camera iris. Liquid crystal iris 10 comprises a first ECB liquid crystal device 12 and a second ECB liquid crystal device 14, each of which contains liquid crystal having a positive dielectric anisotropy. For simplicity, index matching coatings of each of ECB liquid crystal devices 12 and 14 are omitted from the diagram. ECB liquid crystal devices 12 and 14 have, respectively, a director field 16 composed of liquid crystal directors 18 and a director field 20 composed of liquid crystal directors 22. Each of director fields 16 and 20 is shown in FIG. 5 at an intermediate drive voltage, V. Director field 20 of ECB liquid crystal device 14 is a mirror image of director field 16 of ECB liquid crystal device 12. In other words, liquid crystal directors 22 in director field 20 are reversely arranged in comparison to corresponding liquid crystal directors 18 in director field 16.

ECB liquid crystal device 12 has a spaced-apart pair of first electrode structures that include substrate plates $24_1$ and $24_2$. An optically transparent electrode $26_1$ formed on substrate plate $24_1$ constitutes, for one first electrode structure of the pair, an interior surface on which is formed an alignment layer $28_1$. An optically transparent electrode $26_2$ formed on substrate plate $24_2$ constitutes, for the other first electrode structure of the pair, an interior surface on which is formed an alignment layer $28_2$. Alignment layers $28_1$ and $28_2$ have respective alignment surfaces $30_1$ and $30_2$.

ECB liquid crystal device 14 has a spaced-apart pair of second electrode structures that include substrate plates $32_1$ and $32_2$. An optically transparent electrode $34_1$ formed on substrate plate $32_1$ constitutes, for one second electrode structure of the pair, an interior surface on which is formed an alignment layer $36_1$. An optically transparent electrode $34_2$ formed on substrate plate $32_2$ constitutes, for the other second electrode structure of the pair, an interior surface on which is formed an alignment layer $36_2$. Alignment layers $36_1$ and $36_2$ have respective alignment surfaces $38_1$ and $38_2$.

Surface-contacting directors 18c and 22c make angles α with their respective alignment surfaces $30_1$, $30_2$ and $38_1$, $38_2$. Azimuthal directions of the surface-contacting directors are indicated by arrows. Specifically, arrows 40 indicate the azimuthal direction of surface-contacting directors 18c and 22c at alignment surfaces $30_1$ and $38_2$, respectively; and arrows 42 indicate the azimuthal direction of surface-contacting directors 18c and 22c at alignment surfaces $30_2$ and $38_1$. Arrows 42 are parallel at the adjoining or confronting surfaces of substrate plates $24_2$ and $32_1$ of ECB liquid crystal devices 12 and 14, respectively. To obtain high contrast ratios, one or more external retarders are included in liquid crystal iris 10 to compensate for the combined residual retardation of ECB liquid crystal devices 12 and 14. The slow axis of the retarder is set in generally perpendicular alignment to the azimuthal direction of the surface-contacting directors of the alignment layer to which the retarder is in adjacent position, although other retarder axis orientations are also possible. The retarder or retarders can be placed at locations $44_1$, $44_2$, and $44_3$, as indicated in FIG. 5. ECB liquid crystal devices 12 and 14 are positioned between linear polarizers 46 and 48, with their transmission axes orthogonally aligned. Incoming light 50 is incident on polarizer 46.

Figure 6:
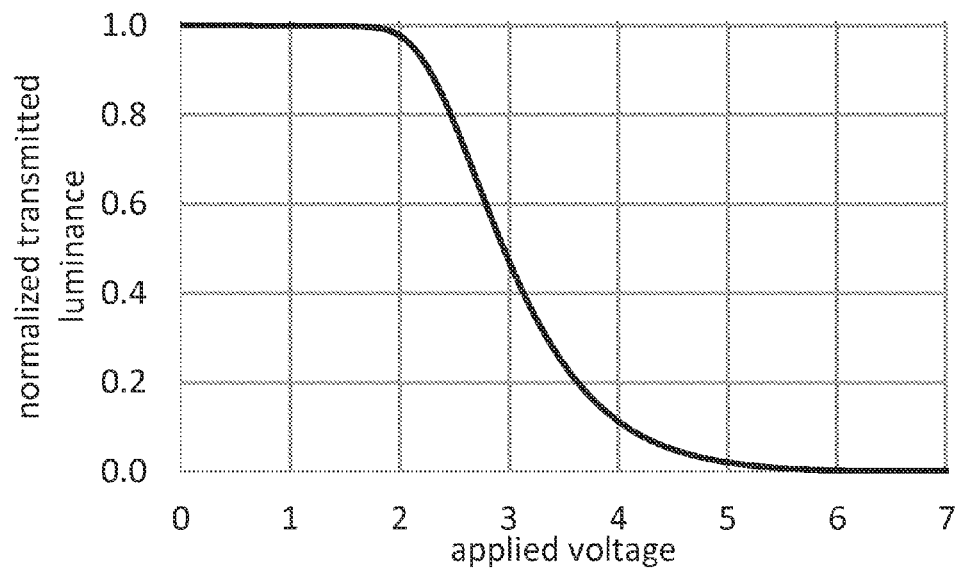
FIG. 6 is a normalized transmitted luminance electro-optic curve of the first embodiment of FIG. 5, showing the normalized transmitted luminance as a function of applied voltage.

FIG. 6 shows a simulated electro-optic curve of an example of the first implementation of the first embodiment represented by liquid crystal iris 10. The liquid crystal MLC-7030 is used in the simulation, and the cell gap of each of ECB liquid crystal devices 12 and 14 is set at 1.50 μm. The pretilt angle α is 3°. To obtain a high contrast ratio, 31.4 nm polycarbonate retarders are placed at locations $44_2$ and $44_3$, with their slow axes set in perpendicular alignment to azimuthal direction 40 of the surface-contacting directors 18c and 22c of ECB liquid crystal devices 12 and 14, respectively. In this orientation, the two retarders fully compensate the combined residual retardation of ECB liquid crystal devices 12 and 14 at an applied voltage of 6.51V. The combination of ECB liquid crystal devices 12 and 14 and associated retarders at locations $44_2$ and $44_3$ is placed between orthogonally aligned polarizers 46 and 48 such that azimuthal directions 40 of surface-contacting directors 18c and 22c of the respective ECB liquid crystal devices 12 and 14 make a 45° angle with the polarization direction of light incident on a light input face 52 of substrate plate $24_1$. The normalized transmitted luminance is 50% for an applied voltage of 2.95V, and the normalized transmitted luminances at 6.16V is 0.1%, thereby resulting in a contrast ratio of 1,000.

Figure 1:
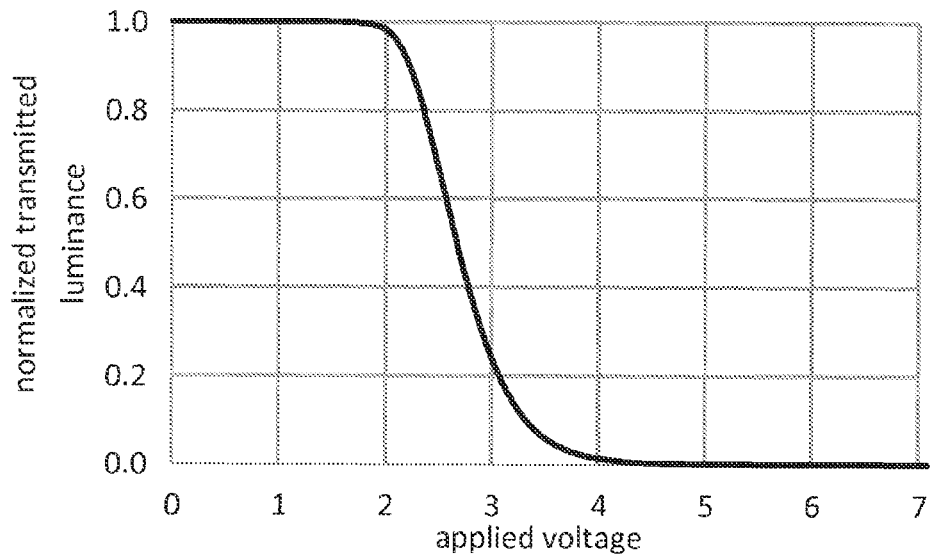
FIG. 1 is a simulated normalized transmitted luminance electro-optic curve of a prior art iris comprising a TN liquid crystal device.
Figure 2:
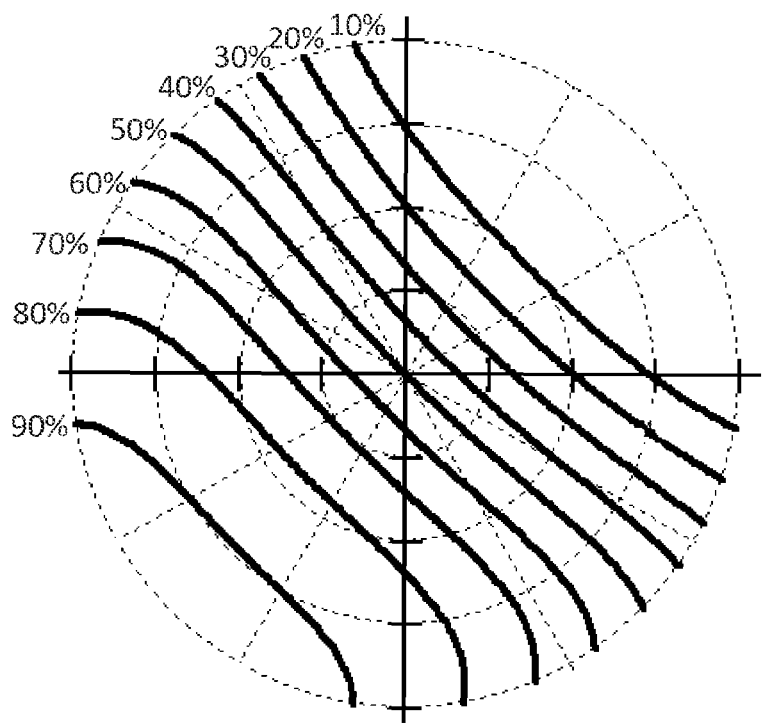
FIG. 2 shows a normalized iso-transmitted luminance polar contour diagram of the prior art camera iris of FIG. 1, comprising a single TN liquid crystal device with a drive voltage adjusted to give 50% normalized transmitted luminance for normally incident light.
Figure 3:
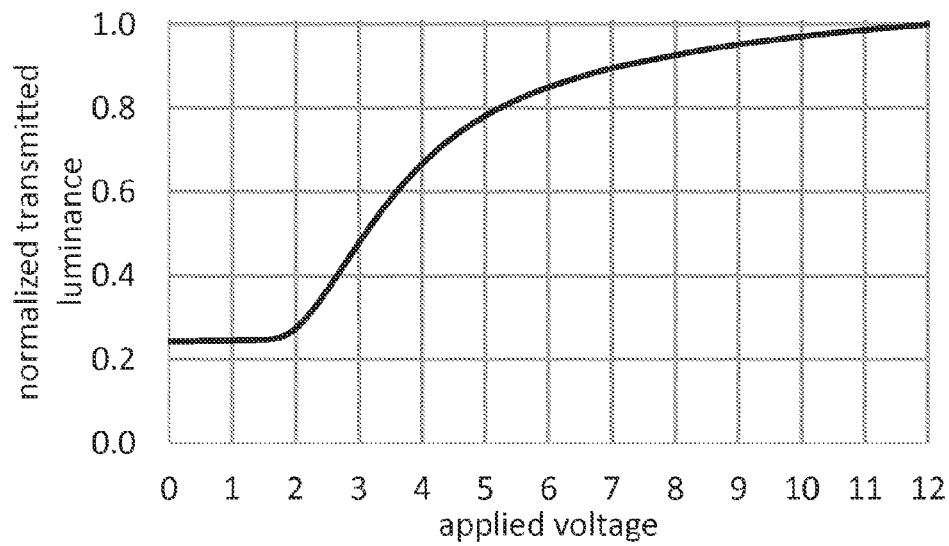
FIG. 3 is a simulated normalized transmitted luminance electro-optic curve of a prior art camera iris comprising two orthogonally aligned guest-host liquid crystal devices.
Figure 4:
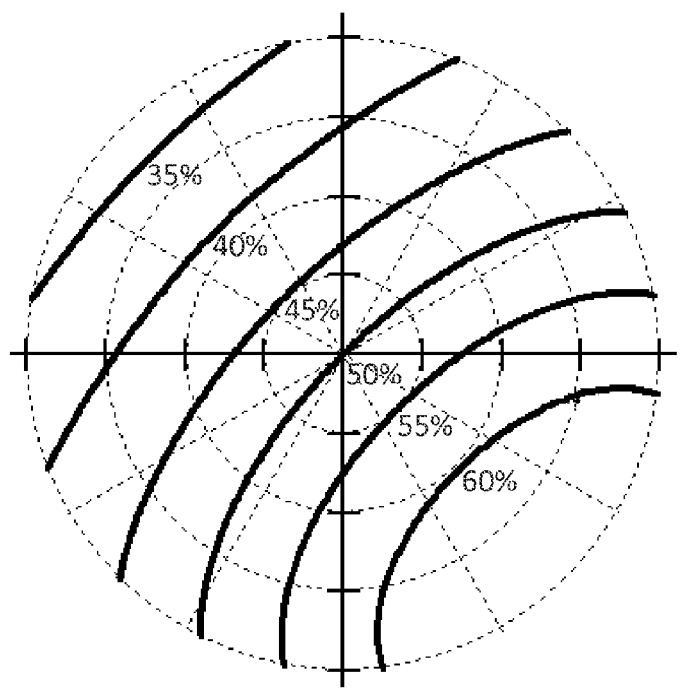
FIG. 4 shows a simulated normalized iso-transmitted luminance polar contour diagram of the prior art camera iris of FIG. 3, comprising two orthogonally aligned guest-host liquid crystal devices with a drive voltage adjusted to give 50% normalized transmitted luminance for normally incident light.
Figure 7A:
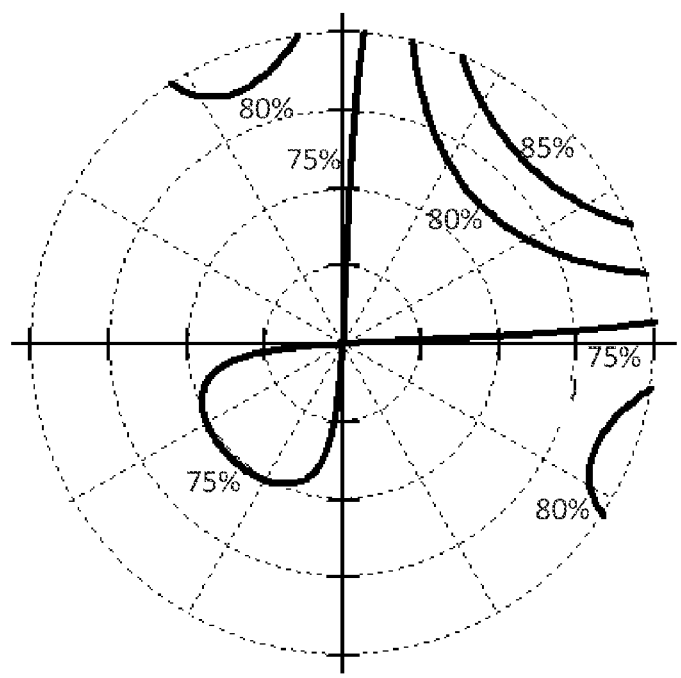
FIGS. 7A, 7B, and 7C show normalized iso-transmitted luminance polar contour diagrams of the camera iris according the first embodiment depicted in FIG. 5, with the drive voltage adjusted to give, respectively, 75%, 50%, and 25% normalized transmitted luminance for normally incident light.
Figure 7B:
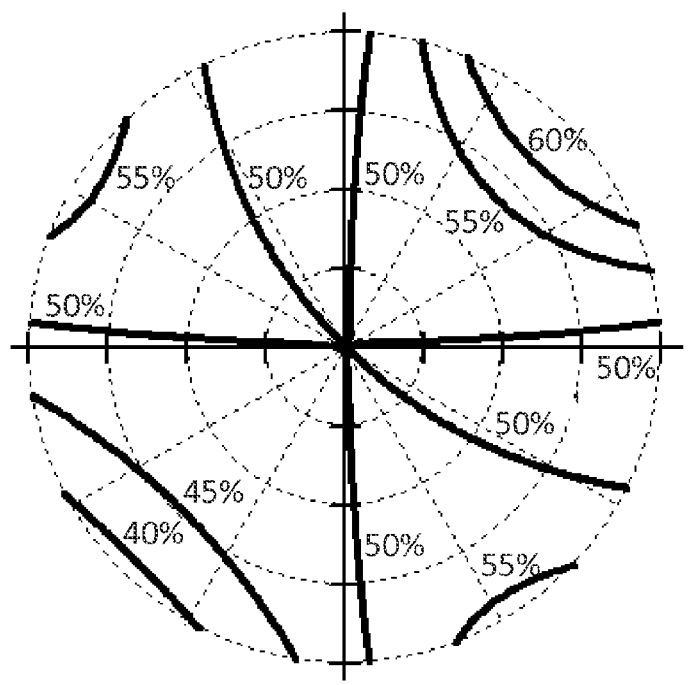
Figure 7C:
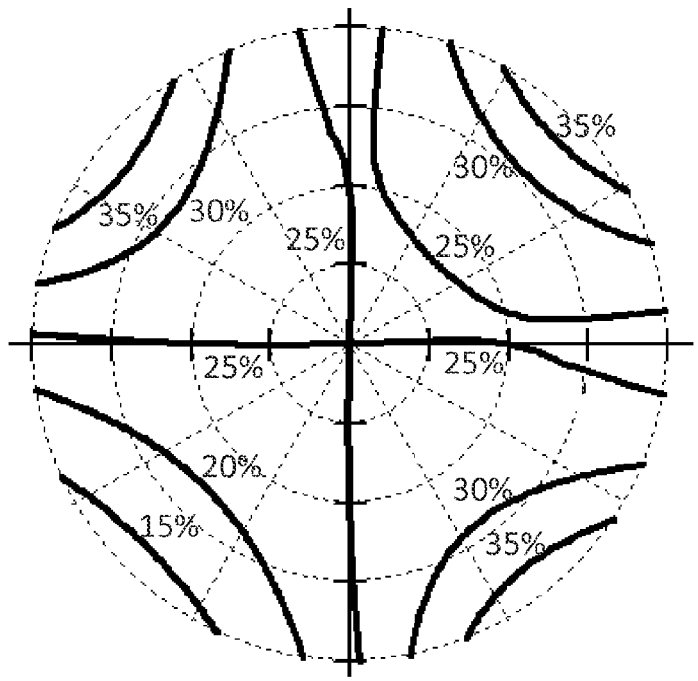

FIGS. 7A, 7B, and 7C show the angular dependence of the normalized transmitted luminance under application of three different drive voltages, V. Drive voltages of 2.55V, 2.95V, and 3.47V, give, respectively, 75%, 50%, and 25% transmitted luminance at normal incidence. As in FIG. 2, these data are presented in FIGS. 7A, 7B, and 7C in the form of normalized iso-transmitted luminance polar contour diagrams, Comparing FIG. 7B with FIG. 2 for the prior art TN iris, it is apparent that there is remarkable improvement in the uniformity of the angular dependence of the 50% gray level. FIGS. 7A and 7C show good uniformity of angular dependence of the 75% gray level and of the 25% gray level, respectively. Liquid crystal iris 10 of the first embodiment is eminently suitable for use as a camera iris because it can achieve a high contrast ratio and exhibits capability to maintain a uniform gray level over a wide range of light input angles.

Figure 8A:
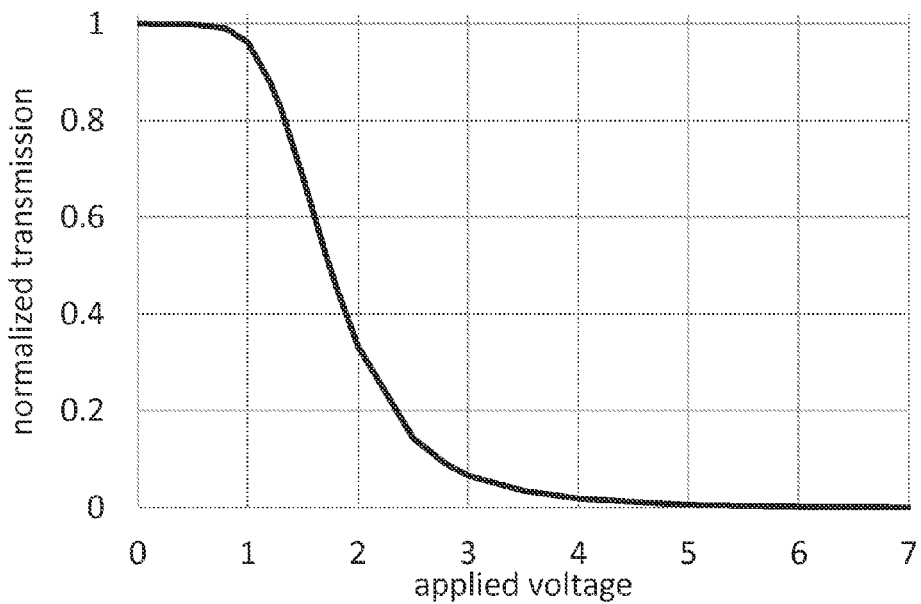
FIG. 8A shows a measured normalized transmitted luminance electro-optic curve according to the first embodiment depicted in FIG. 5.

FIG. 8A shows a measured normalized transmitted luminance electro-optic curve at normal incidence for an example of liquid crystal iris 10 of the first implementation of the first embodiment. The liquid crystal used in ECB liquid crystal devices 12 and 14 for this measurement has a birefringence of 0.099 at 589 nm and 20° C., and the cell gap of each of ECB liquid crystal devices 12 and 14 is set at 1.4 μm. A first 15 nm retarder film is placed in retarder location $44_2$, at light input face 52 of substrate plate $24_1$ of ECB liquid crystal device 12. The slow axis of the first 15 nm retarder is set perpendicular to azimuthal direction 40 of surface-contacting directors 18c at light input face 52. A second 15 nm retarder film is placed in retarder location $44_3$, at a light exit face 54 of substrate plate $32_2$ of ECB liquid crystal device 14. The slow axis of the second 15 nm retarder is set perpendicular to azimuthal direction 40 of surface-contacting directors 22c at light exit face 54. The combination of ECB liquid crystal devices 12 and 14 and associated retarders positioned in locations $44_2$ and $44_3$ is placed between orthogonally aligned polarizers 46 and 48, such that azimuthal direction 40 of surface-contacting directors 18c and 22c of the respective ECB liquid crystal devices 12 and 14 make a 45° angle with the polarization direction of the incident light. For applied voltages of 1.41V, 1.74V, and 2.22V, the normalized transmitted luminance at normal incidence is 75%, 50%, and 25%, respectively.

Figure 8B:
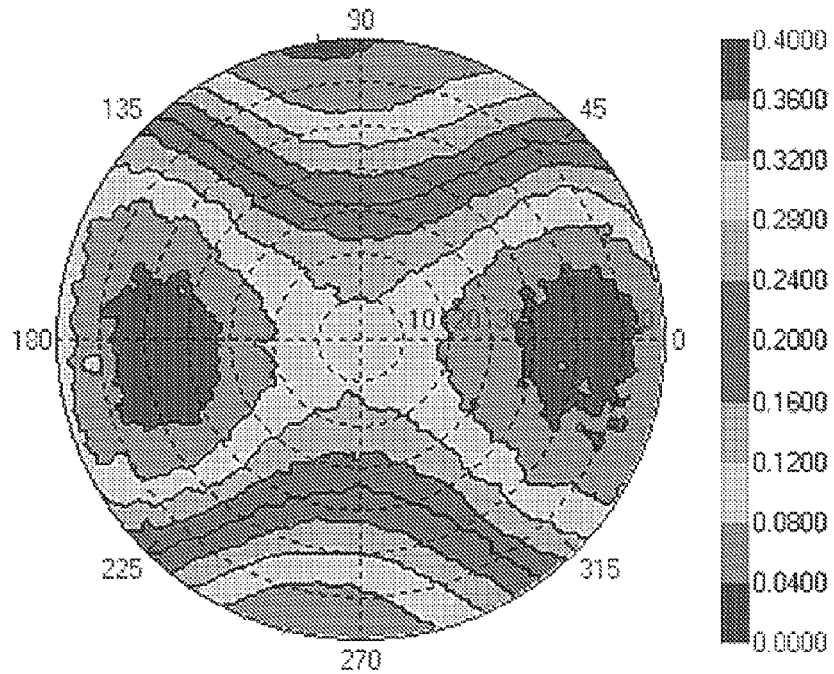
FIGS. 8B, 8C, and 8D show measured iso-transmitted luminance polar contour diagrams according to the first embodiment depicted in FIG. 5, taken at, respectively, 1.41V with 75% normalized gray level at normal incidence, 1.74V with 50% normalized gray level at normal incidence, and 2.22V with 25% normalized gray level at normal incidence.
Figure 8C:
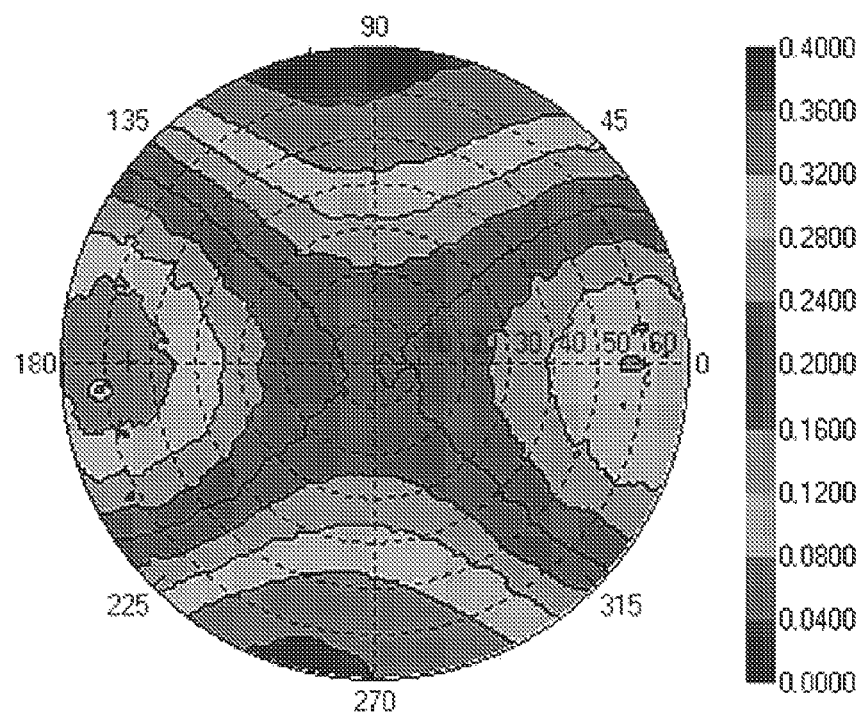
Figure 8D:
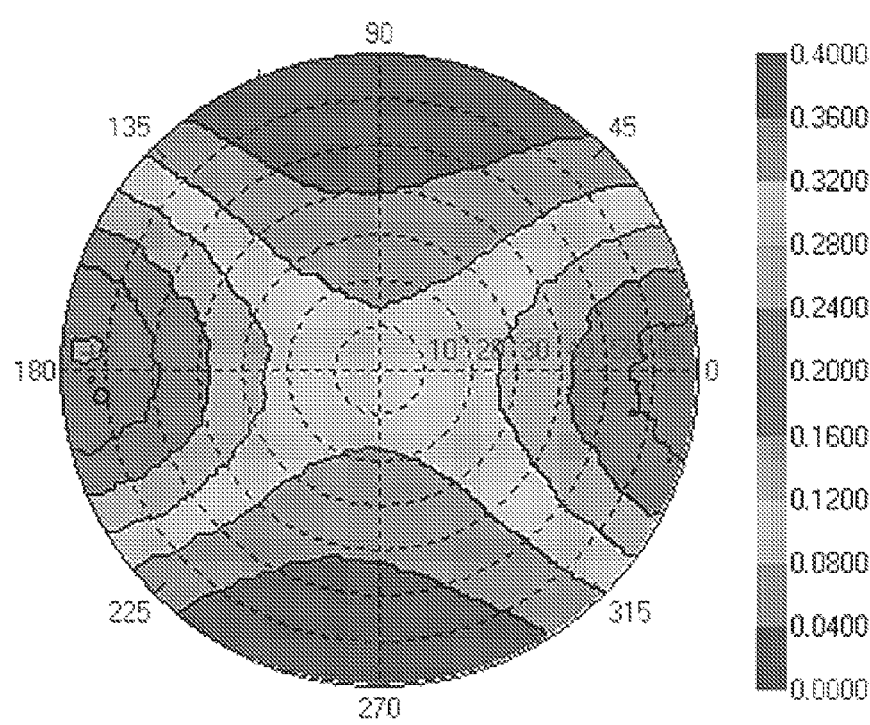

FIGS. 8B, 8C, and 8D show measured iso-transmitted luminance polar contour diagrams of the above example of liquid crystal iris 10 of the first embodiment for applied voltages of 1.41V, 1.74V, and 2.22V, for which the normalized transmitted luminance at normal incidence is 75%, 50%, and 25%, respectively. The central portions of these diagrams exhibit only a weak angular dependence of the transmission, thereby verifying the simulated results and showing the suitability of liquid crystal iris 10 of the first implementation of the first embodiment for a camera iris application.

Figure 9:
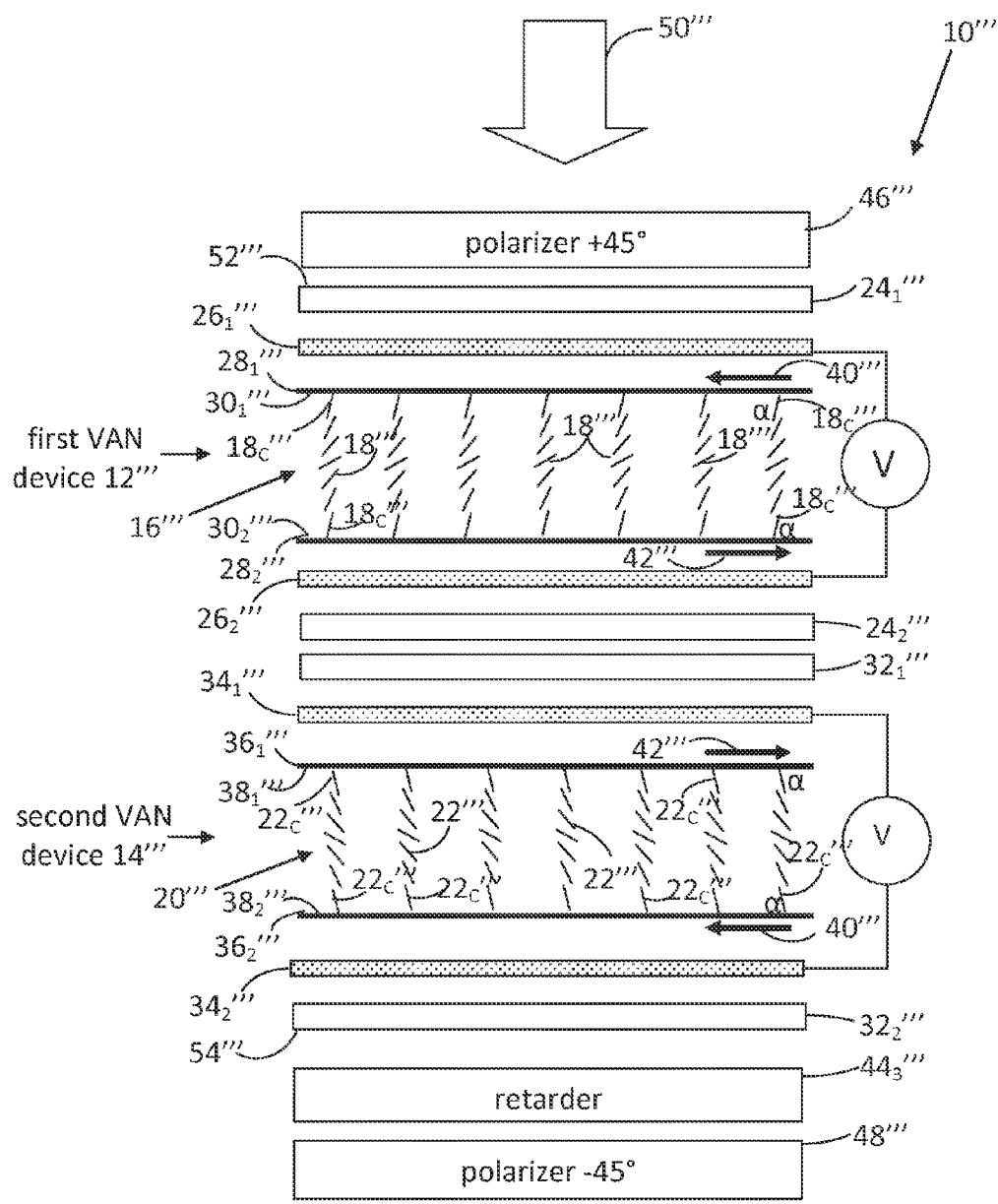
FIG. 9 is a diagrammatic exploded view of a second implementation of a first embodiment of the disclosed electro-optic liquid crystal camera iris comprising first and second vertically aligned nematic (VAN) devices, in which the director field of the second liquid crystal device is a mirror image of the director field of the first liquid crystal device, and in which the first and second liquid crystal devices are placed together so that the azimuthal directions of the surface-contacting directors of the adjoining or confronting surfaces of the substrates of the two liquid crystal devices are in parallel alignment.

FIG. 9 is a simplified diagram of a liquid crystal iris 10" configured as a second implementation of the first embodiment of the disclosed electro-optic liquid crystal camera iris. The second implementation is one in which the liquid crystal has a negative dielectric anisotropy and the surface contacting directors make small pretilt angles from the direction normal to the liquid crystal layer. The second implementation also uses two ECB liquid crystal devices, which for the case of negative dielectric anisotropy liquid crystals are more commonly referred to as vertically aligned nematic, or VAN, liquid crystal devices.

The construction of the first embodiment using VAN liquid crystal devices is the same as that of liquid crystal iris 10 shown in FIG. 5 for the first implementation of the first embodiment that uses positive dielectric anisotropy liquid crystals, except as described below. The director fields of the liquid crystal devices in the second implementation differ from the director fields 16 and 20 of ECB liquid crystal devices 12 and 14 of the first implementation of the first embodiment. The liquid crystal devices and their associated director fields of the second implementation shown in FIG.

9 are, therefore, indicated by corresponding reference numerals followed by triple primes ('").

Liquid crystal iris 10'" comprises a first VAN liquid crystal device 12'" and a second VAN liquid crystal device 14'", each of which contains liquid crystal having a negative dielectric anisotropy. For simplicity, index matching coatings of each of VAN liquid crystal devices 12'" and 14'" are omitted from the diagram. VAN liquid crystal devices 12'" and 14'" have, respectively, a director field 16'" composed of liquid crystal directors 18'" and a director field 20'" composed of liquid crystal directors 22'". Each of director fields 16'" and 20'" is shown in at an intermediate drive voltage, V. Director field 20'" of VAN liquid crystal device 14'" is a mirror image of director field 16'" of VAN liquid crystal device 12'". In other words, liquid crystal directors 22'" in director field 20'" are reversely arranged in comparison to corresponding liquid crystal directors 18'" in director field 16'".

VAN liquid crystal device 12'" has a spaced-apart pair of first electrode structures that include substrate plates $24_1$'" and $24_2$'". An optically transparent electrode $26_1$'" formed on substrate plate $24_1$'" constitutes, for one first electrode structure of the pair, an interior surface on which is formed an alignment layer $28_1$'". An optically transparent electrode $26_2$'" formed on substrate plate $24_2$'" constitutes, for the other first electrode structure of the pair, an interior surface on which is formed an alignment layer $28_2$'". Alignment layers $28_1$'" and $28_2$'" have respective alignment surfaces $30_1$'" and $30_2$'".

VAN liquid crystal device 14'" has a spaced-apart pair of second electrode structures that include substrate plates $32_1$'" and $32_2$'". An optically transparent electrode $34_1$'" formed on substrate plate $32_1$'" constitutes, for one second electrode structure of the pair, an interior surface on which is formed an alignment layer $36_1$'". An optically transparent electrode $34_2$'" formed on substrate plate $32_2$'" constitutes, for the other second electrode structure of the pair, an interior surface on which is formed an alignment layer $36_2$'". Alignment layers $36_1$'" and $36_2$'" have respective alignment surfaces $38_1$'" and $38_2$'".

Surface-contacting directors 18c'" and 22c'" make angles α with their respective alignment surfaces $30_1$'", $30_2$'" and $38_1$'", $38_2$'". Azimuthal directions of the surface-contacting directors are indicated by arrows. Specifically, arrows 40'" indicate the azimuthal direction of surface-contacting directors 18c'" and 22c'" at alignment surfaces $30_1$'" and $38_2$'", respectively; and arrows 42'" indicate the azimuthal direction of surface-contacting directors 18c'" and 22c'" at alignment surfaces $30_2$'" and $38_1$'". Arrows 42'" are parallel at the adjoining or confronting surfaces of substrate plates $24_2$'" and $32_1$'" of VAN liquid crystal devices 12'" and 14'", respectively.

The transmission direction of polarizer 46'" is set at 45°, and the transmission direction of analyzer 48'" is set at −45° with respect to the azimuthal directions 40'" and 42'" of the surface contacting directors. Retarder film $44_3$'" placed at a location between light exit face 54'" and polarizer 48'" is the only retarder film present in the second implementation. Unlike the positive dielectric anisotropy liquid crystal devices of the first implementation shown in FIG. 5, the VAN liquid crystal devices of FIG. 9 have comparatively low residual retardances and generally do not require retardation films to compensate for such low values, although such retardation films could be added. The purpose of retarder film $44_3$'" is to improve the angular uniformity of the light transmitted by iris 10'". Retarder film $44_3$'" is a biaxial retarder having an in-plane retardation $R_o$ and an out-of plane retardation $R_{th}$, with the in-plane slow axis oriented parallel to the transmission axis of the adjacent polarizer 48'".

Figure 10:
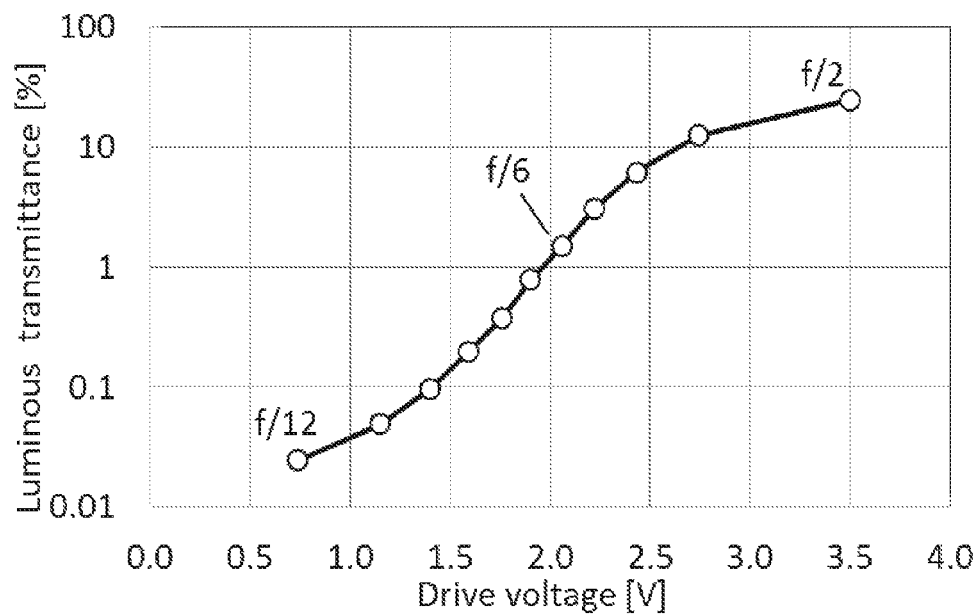
FIG. 10 is the measured transmitted luminance electro-optic curve of an example of the first embodiment of FIG. 9, showing the transmitted luminance as a function of applied voltage. Data points indicating unit f-stop settings from f/2 to f/12 are superimposed on the curve.

FIG. 10 shows a transmitted luminance electro-optic curve measured at normal incidence for the second implementation represented by liquid crystal iris 10'" of FIG. 9. In this example, the liquid crystal has a birefringence of 0.08 and a dielectric anisotropy of −4.4, and the cell gap of each VAN liquid crystal device 12'" and 14'" is 2.40 μm. Polarizers 46'" and 48'" are of the high durability type with a 39% transmission in unpolarized light and have protective TAO layers, each with out-of-plane retardations of approximately −40 nm. The biaxial retarder has 55 nm of in-plane retardation ($R_o$) and 220 nm of out-of-plane retardation ($R_{th}$). The points on the transmitted luminance electro-optic curve are transmitted luminance values corresponding to camera f-stop settings. A transmitted luminance of 25%, for example, corresponds to f/2, which is shown by the point superimposed at the right end of the curve. With each increasing f-stop setting, the transmitted luminance decreases by a factor of 2. For f/6, the transmitted luminance is 1.5625%; and for f/12, the point at the left end of the curve, the transmitted luminance is 0.02441%. Intermediate points on the curve correspond to unit f-stop settings between f/2 and f/12.

Figure 11A:
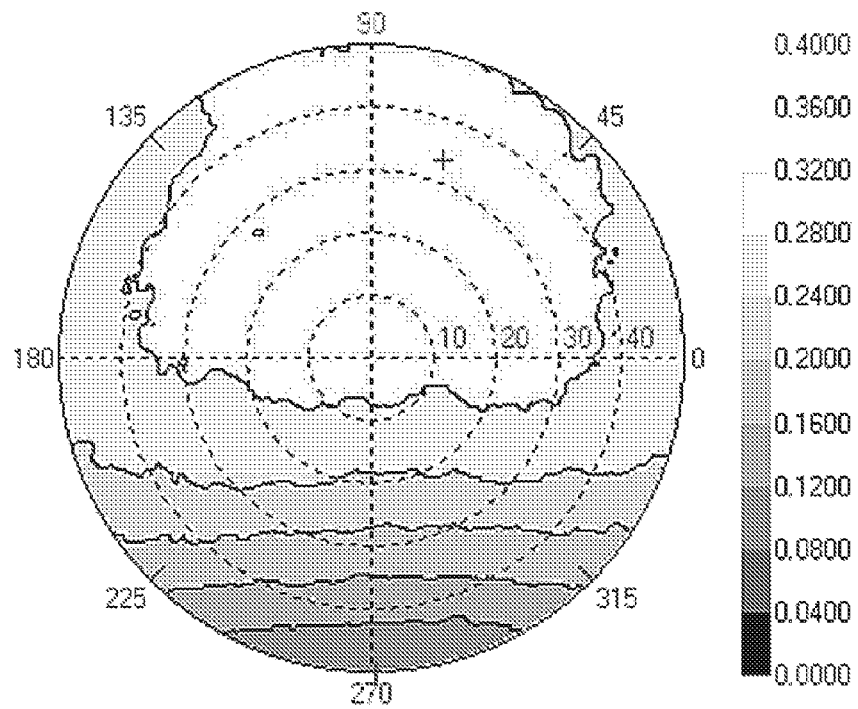
FIGS. 11A, 11B, and 11C show measured iso-transmitted luminance polar contour diagrams of a liquid crystal iris comprising a single, prior-art VAN liquid crystal device measured at f-stop settings of f/2, f/6, and f/12.
Figure 11B:
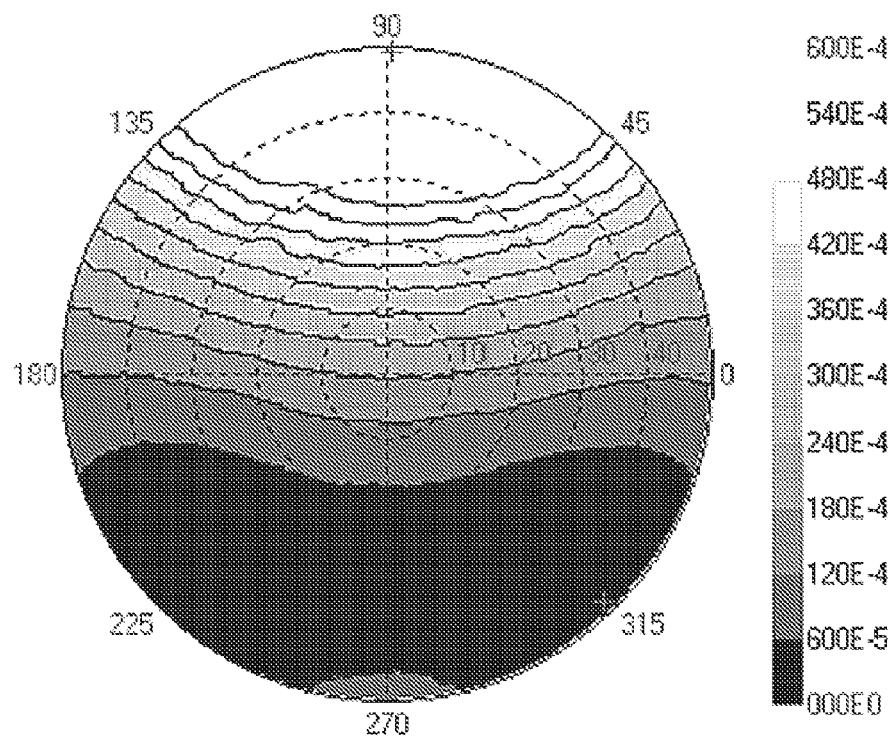
Figure 11C:
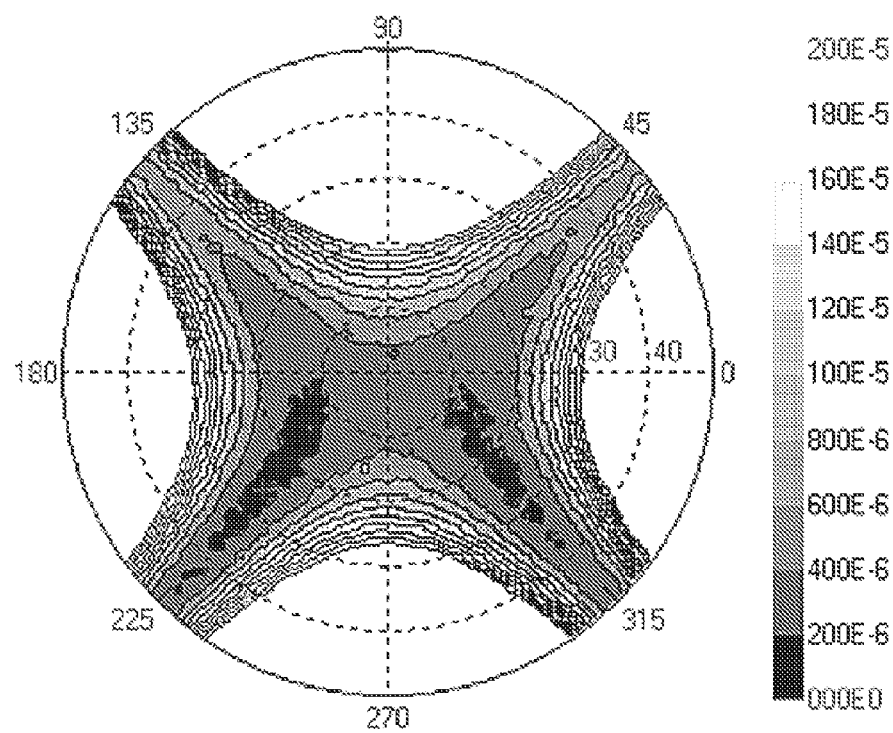
Figure 12A:
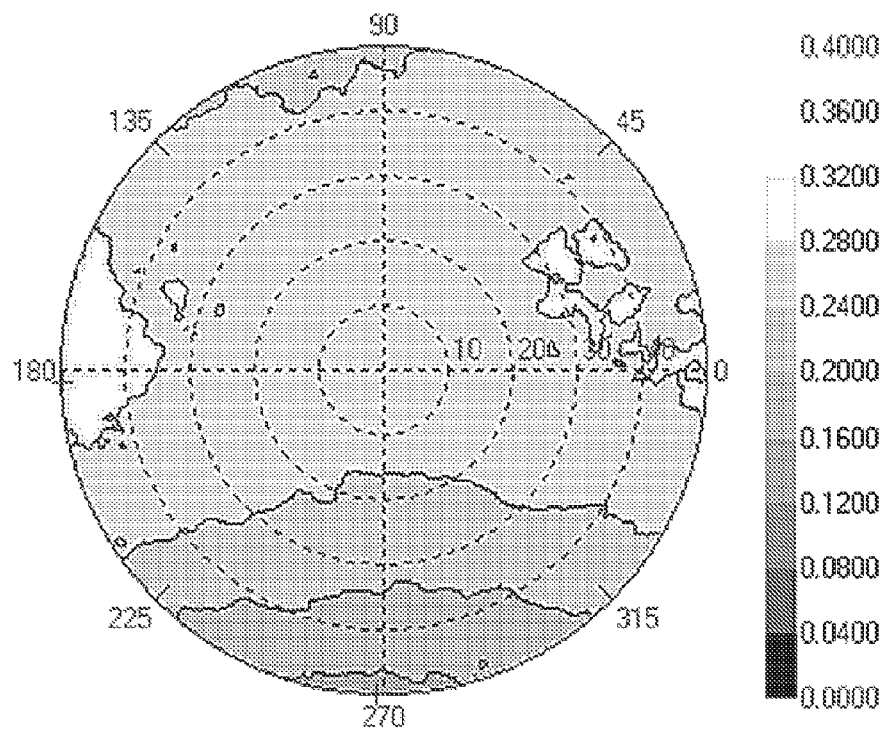
FIGS. 12A, 12B, and 12C show measured iso-transmitted luminance polar contour diagrams of a liquid crystal iris of FIG. 9 comprising two VAN liquid crystal devices but no retarder film, measured at f-stop settings of f/2, f/6, and f/12.
Figure 12B:
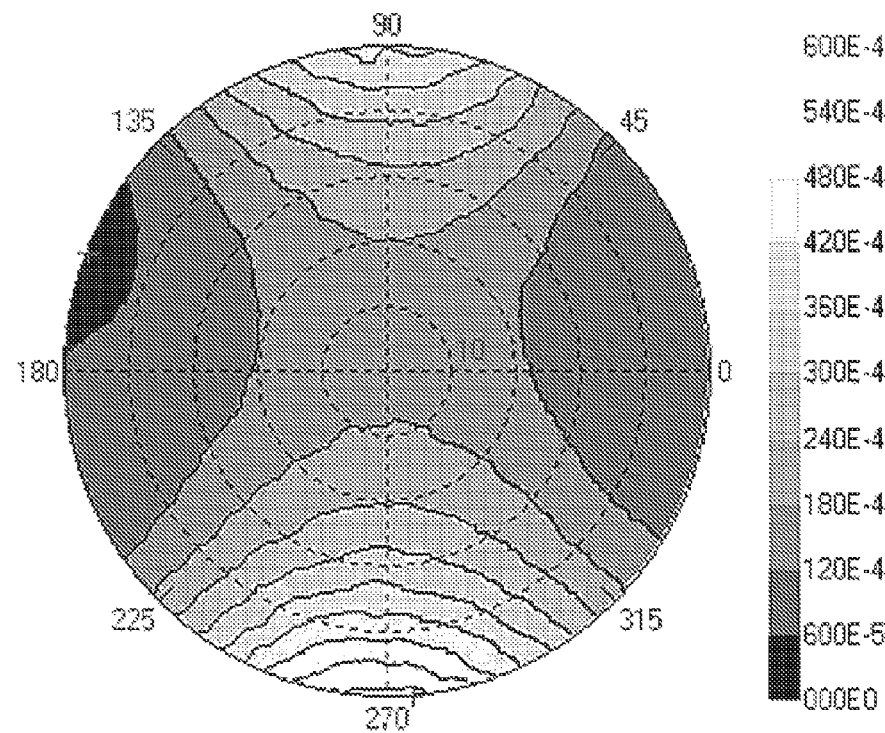
Figure 12C:
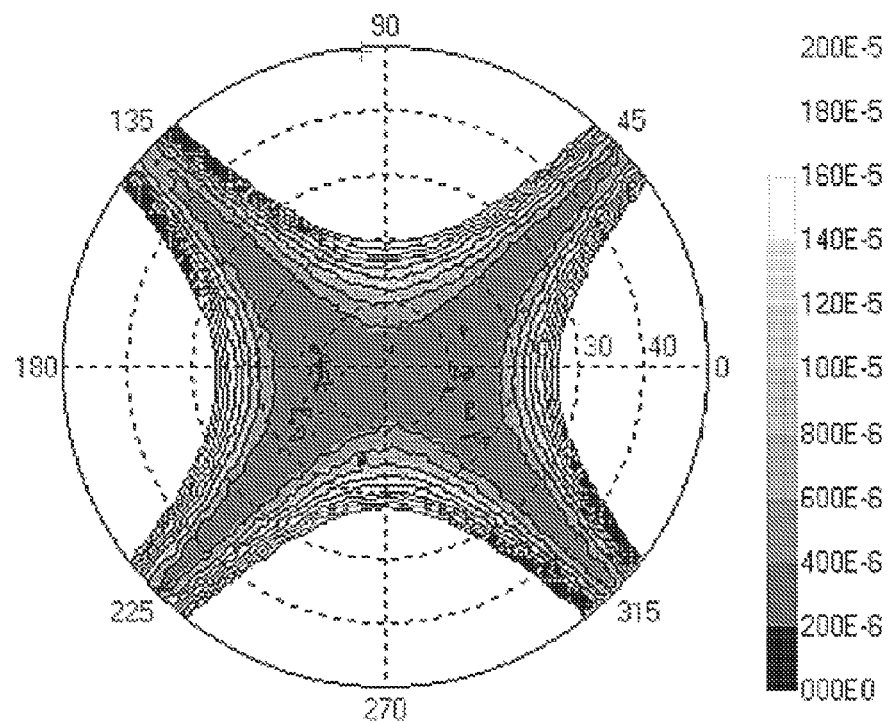
Figure 13A:
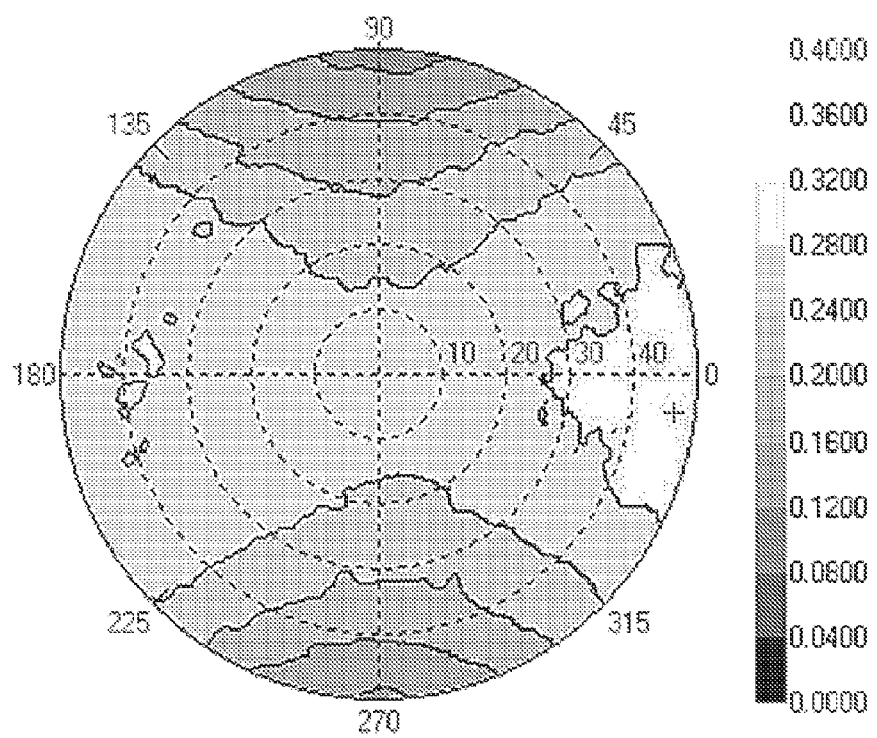
FIGS. 13A, 13B, and 13C show measured iso-transmitted luminance polar contour diagrams of a liquid crystal iris of the second implementation of the first embodiment of FIG. 9 comprising two VAN liquid crystal devices and a biaxial retarder, measured at f-stop settings of f/2, f/6, and f/12.
Figure 13B:
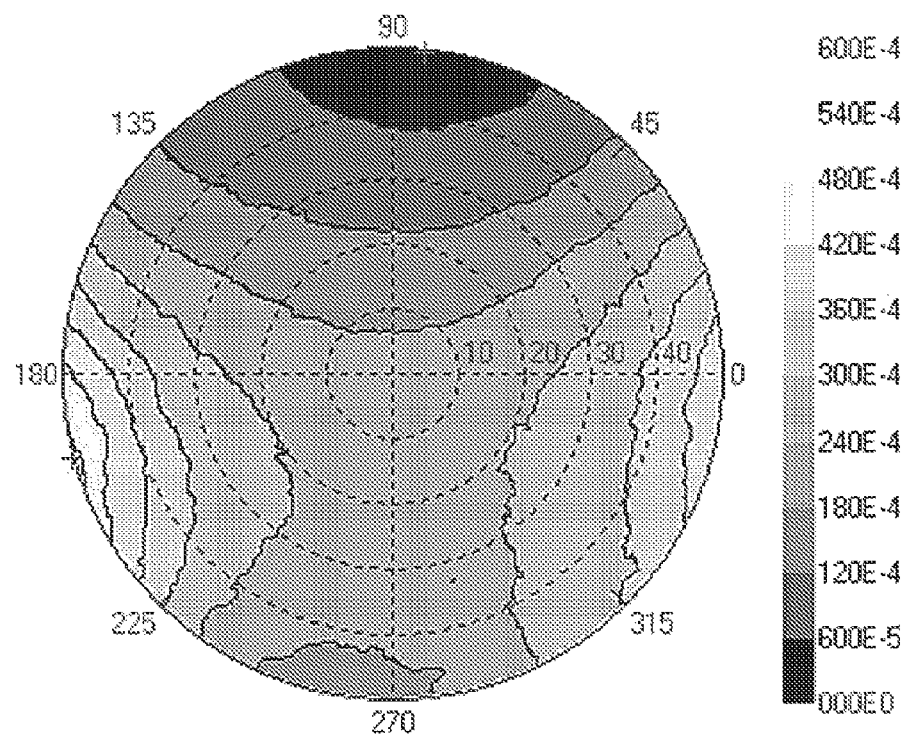
Figure 13C:
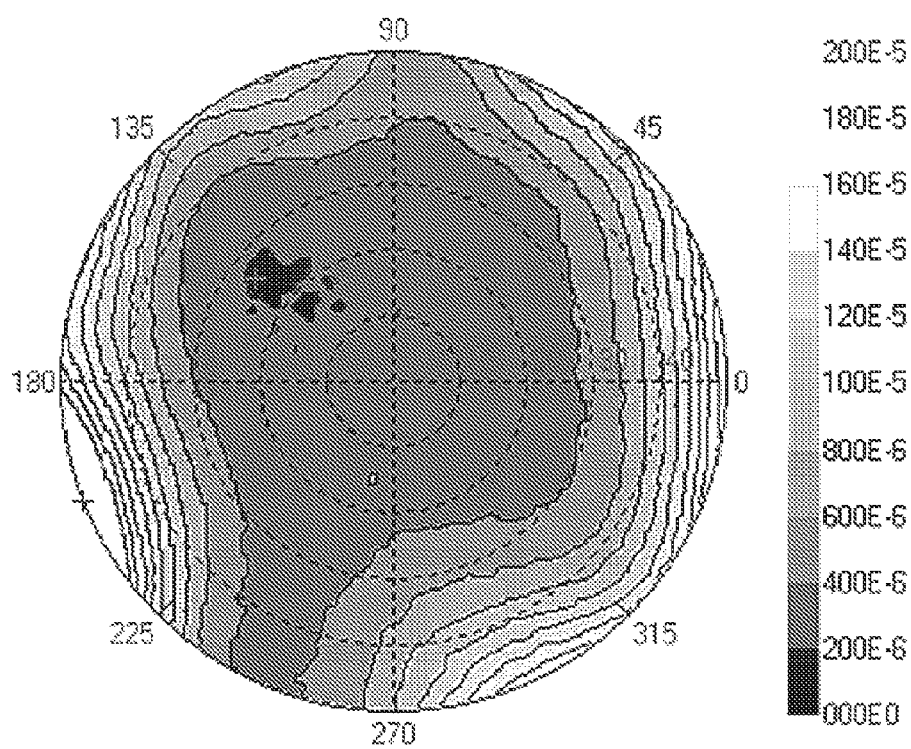

FIGS. 11A, 11B, and 11C show the angular dependence of the transmitted luminance at the f-stop settings of f/2, f/6, and f/12 for the prior art case of liquid crystal iris comprising a single VAN liquid crystal device. The angular data is presented in the form of iso-transmitted luminance polar contour diagrams. The uniformity of the angular dependence of the transmitted luminance at f/6 and f/12 is poor. FIGS. 12A, 12B, and 12C show the angular dependence of the transmitted luminance at the f-stop settings of f/2, f/6, and f/12 for the case in which the liquid crystal iris 10'" comprises two VAN liquid crystal devices assembled as shown in FIG. 9, but without retarder film $44_3$'". The uniformity of the angular dependence of the transmitted luminance at f/6 is greatly improved, but the uniformity at f/12 is still poor. FIGS. 13A, 13B, and 13C show the angular dependence of the transmitted luminance at the f-stop settings of f/2, f/6, and f/12 for the case in which the liquid crystal iris comprises two VAN liquid crystal devices assembled as shown in FIG. 9 and including biaxial retarder $44_3$'" described earlier. Comparison of FIG. 13C to FIG. 12C reveals that the uniformity of the angular dependence of the transmitted luminance at f/12 has been greatly improved by adding biaxial retarder $44_3$'".

Of course, many other configurations of the second implementation of the first embodiment are also possible. The biaxial retarder could be placed on top of the first VAN liquid crystal device 12'", instead of at the bottom of the second VAN liquid crystal device 14'"; or a biaxial retarder could be placed at both top and bottom locations. The biaxial retarder could also be replaced by an A plate retarder and a negative C plate retarder, either in combination or separated, one on each side of the stack of VAN liquid crystal devices 12'" and 14'". A negative C plate retarder could also be placed between VAN liquid crystal devices 12'" and 14'". Similarly, a biaxial retarder could also be added to the first implementation of the first embodiment, in which the liquid crystal has a positive dielectric anisotropy.

Figure 14:
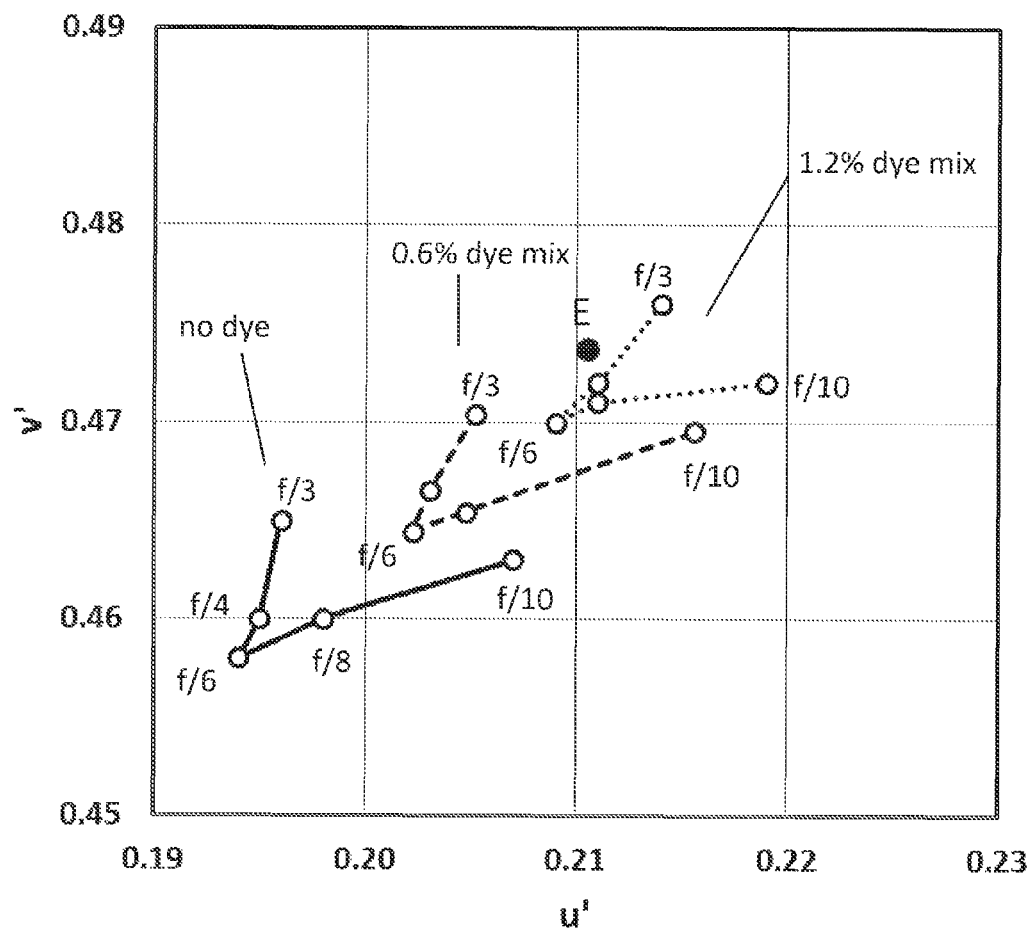
FIG. 14 shows the color coordinates for different f-stop settings in the 1976 CIE (u', v') uniform color space of the liquid crystal iris of the second implementation of the first embodiment of the liquid crystal camera iris. The three different V-shaped curves correspond to three different concentrations of dichroic dye doping.

Ideally, the liquid crystal iris should have achromatic performance over the full range of f-stop settings, i.e., it should not introduce any coloration of its own. Measurements of the performance of liquid crystal iris 10 of the second implementation of the first embodiment with VAN liquid crystal devices 10''' and 12''' show a small f-stop dependent color shift. This is quantitatively indicated by the measured "no dye" curve in FIG. 14, where the (u',v') color coordinates at f-stop settings ranging from f/3 to f/10 are indicated on the 1976 CIE uniform color space. The V-shaped curve, called the f-stop color gamut, is located some distance away from the equal energy white point E at (u',v')=(0.2105, 0.4737). By adding a mixture of dichroic dyes to the liquid crystal it is possible not only to reduce the overall size of the f-stop color gamut, but also to move the f-stop color gamut in a direction closer to the white point. This is illustrated in FIG. 14 by the dashed curve "0.6% dye mix," which shifts the V-shaped curve part of the way toward the white point and by the dotted curve "1.2% dye mix," which brings the V-shaped curve in close proximity to the white point.

Figure 15:
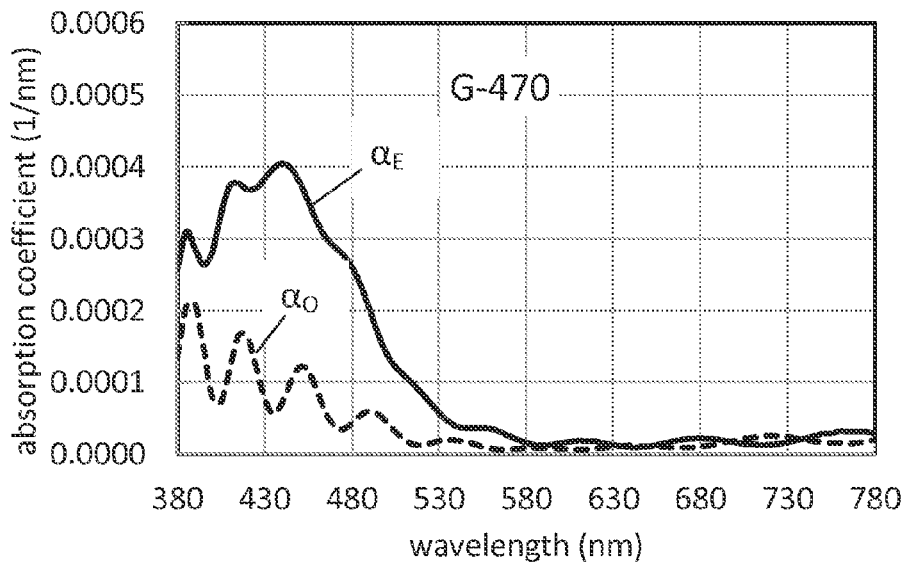
FIG. 15 shows the measured ordinary $\alpha_O$ and extraordinary $\alpha_E$ absorption coefficients of 1 wt. % solution of the yellow Nagase dye G-470.
Figure 16:
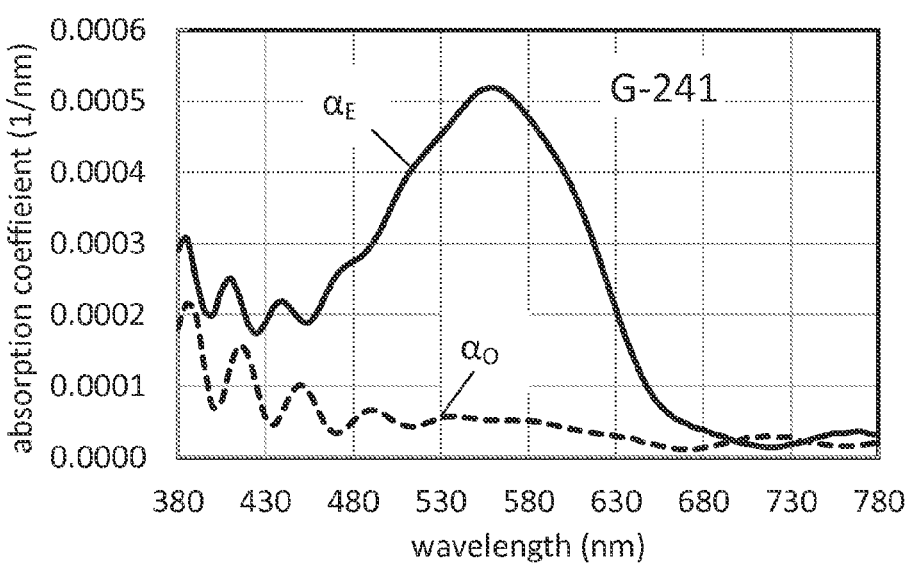
FIG. 16 shows the measured ordinary $\alpha_O$ and extraordinary $\alpha_E$ absorption coefficients of 1 wt. % solution of the magenta Nagase dye G-241.

The 0.6% dye mix comprises the nematic liquid crystal to which is added 0.3 wt. % of the yellow dye G-470 and 0.3 wt. % of the magenta dye G-241. The 1.2% dye mix comprises the nematic liquid crystal with 0.6 wt. % of each of these dyes. The G-470 and G-241 dyes are available in powder form from Nagase, Japan. The spectra of the ordinary $\alpha_O$ and extraordinary $\alpha_E$ absorption coefficients of these two dyes are shown in FIG. 15 and FIG. 16 in units of $nm^{-1}$ for a 1 wt. % dye mixture.

Adding isotropic dyes to the liquid crystal will shift all the color coordinates of the f-stop gamut by the same amount in a direction that depends upon the particular dye color; but since all coordinates are shifted by the same amount, the overall extent of the f-stop gamut remains the same. The same effect could be achieved by simply adding an external color filter. The absorption of light by anisotropic dyes dissolved in the liquid crystal, on the other hand, depends on the liquid crystal director orientation. Positive dichroic dyes can not only shift the f-stop color gamut, but also reduce its size. The overall size is decreased because, for large f-stop settings, the director field inside the VAN liquid crystal devices is nearly homeotropic and the incoming light interacts with the smaller, ordinary absorption coefficient. This shifts the color coordinates by a lesser amount than that which would happen for the lower f-stop settings, where the liquid crystal is tilted away from homeotropic alignment, allowing the light to also interact with the larger, extraordinary absorption coefficient. A positive dichroic dye would also have a similar effect in the first implementation of the first embodiment, in which the liquid crystal has a positive dielectric anisotropy.

Figure 17:
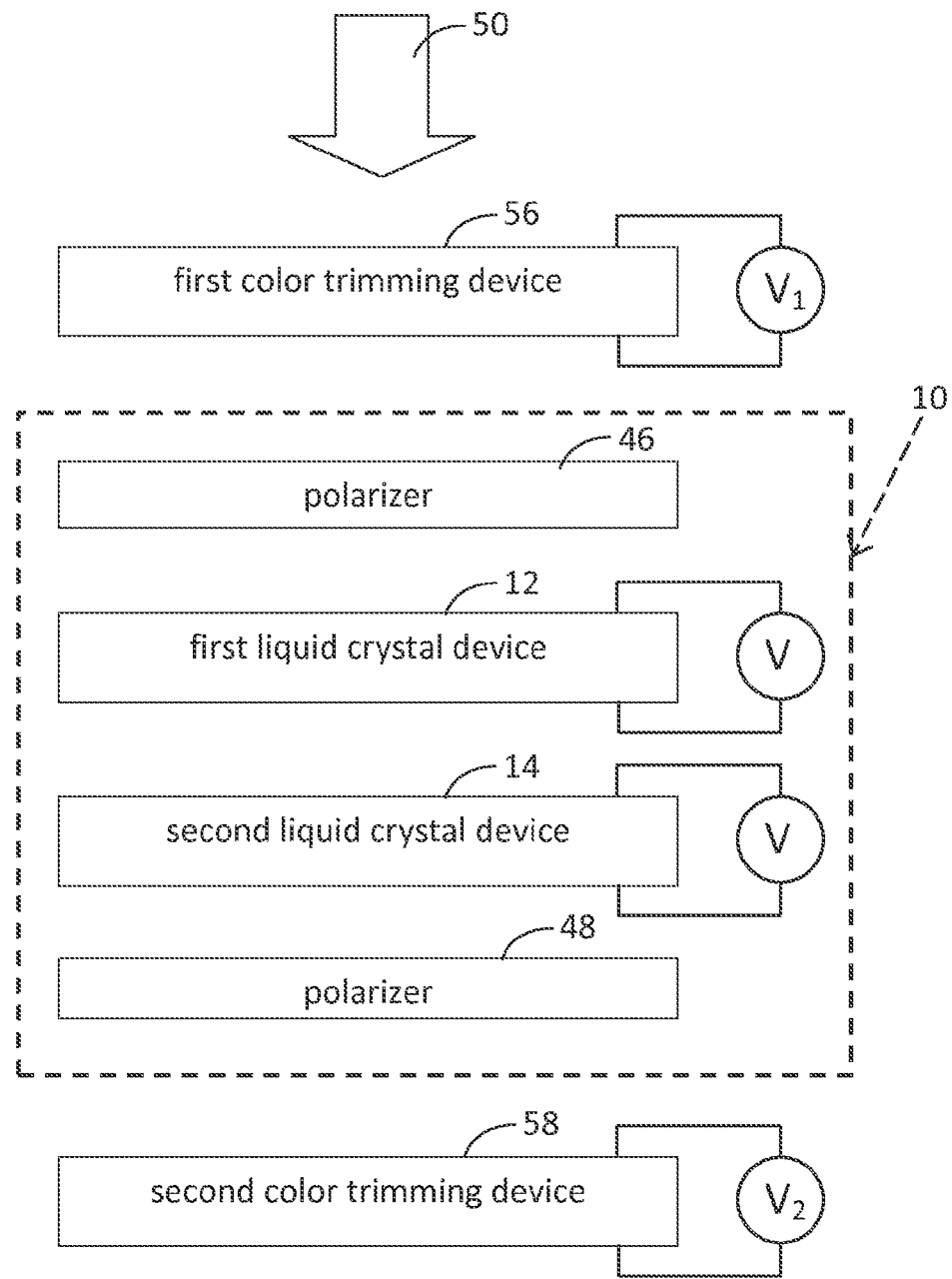
FIG. 17 is a block diagram of the disclosed liquid crystal camera iris that incorporates two color trimming devices into the liquid crystal iris to minimize color shifts between f-stop settings and to make the iris more achromatic.

Rather than incorporating the dichroic dye into the two liquid crystal devices of the iris, the dichroic dye or mixture of dyes could be added to one or more separate liquid crystal electro-optical devices called color trimming devices. Because they are electrically decoupled from the two iris liquid crystal devices, color trimming devices can be independently driven to minimize amount of color shift between the f-stop settings and make the iris more achromatic. FIG. 17 is a block diagram of the disclosed liquid crystal camera iris incorporating a first color trimming device 56 and a second color trimming device 58 located outside of polarizers 46 and 48 of the liquid crystal iris of the first, second, or third embodiments indicated by the dashed-line rectangle. For simplicity, liquid crystal iris 10 is shown and its electrode structures, substrates, director fields, and retardation films have been omitted from the diagram. First and second liquid crystal devices 12 and 14 of iris 10 are both driven with a voltage, V, which is adjusted to substantially produce the desired f-stop setting. First and second color trimming devices 56 and 58 are independently driven with color trimming voltages, $V_1$ and $V_2$, which in cooperation with the iris voltage, V, are adjusted to produce the desired f-stop setting with the most least amount of color tint and color shift between f-stop numbers. Once iris 10 has been calibrated, the appropriate V, $V_1$, and $V_2$ drive voltages, can be, for example, entered into a look-up table, making it possible to rapidly switch between a series of achromatic f-stop settings without requiring further adjustments.

Color trimming devices 56 and 58 are preferably ECB liquid crystal devices that contain a dichroic dye or dye mixture added to the liquid crystal. These color trimming devices are often referred to as guest-host ECB devices. To achieve the greatest color trimming effectiveness, the azimuthal direction of the surface contacting directors of ECB color trimming devices 56 and 58 is oriented parallel to the polarized light transmission direction of their adjacent polarizers 46 and 48, respectively.

Figure 18:
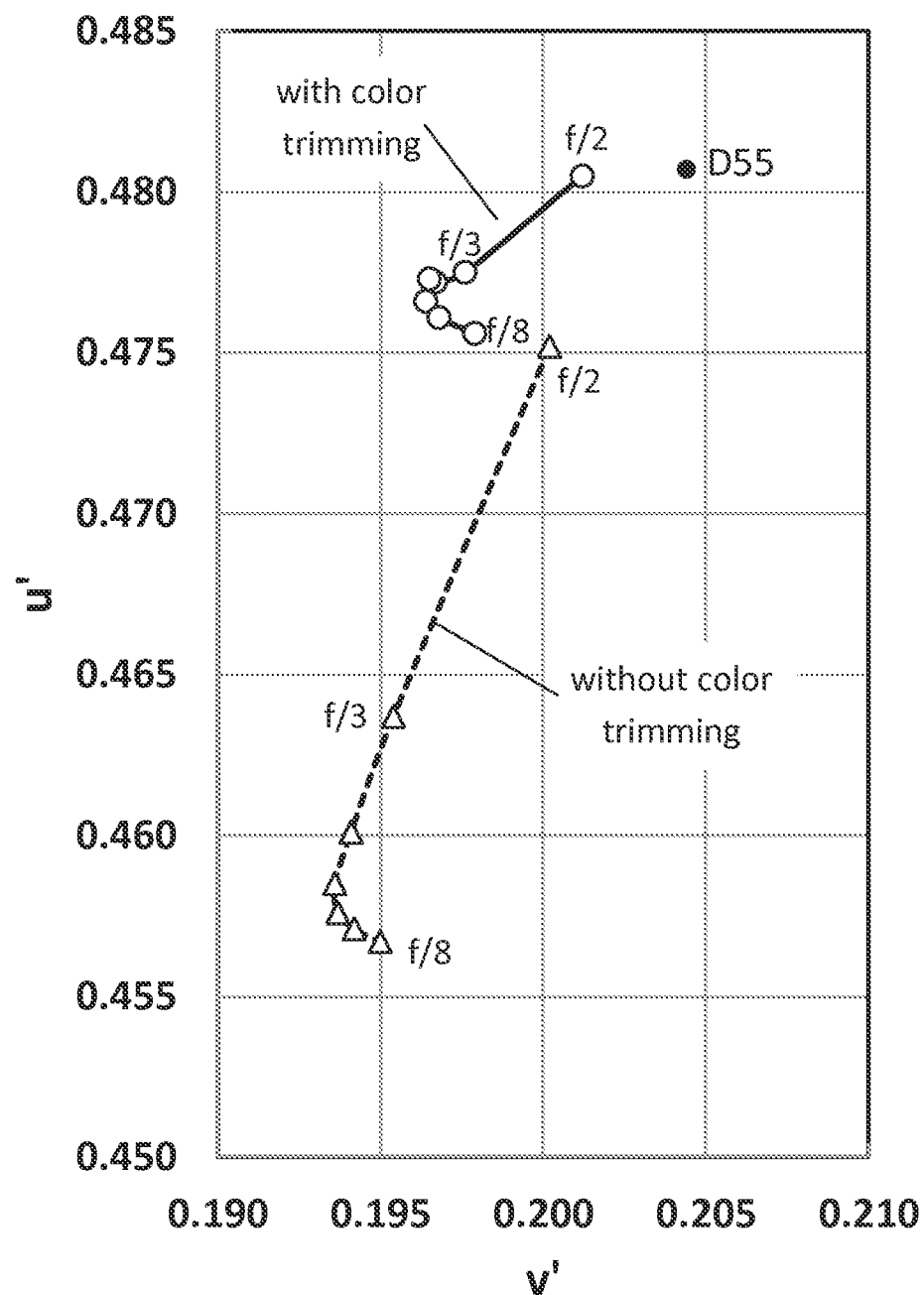
FIG. 18 compares the color coordinates for unit f-stop settings between f/2 and f/8 in the 1976 CIE (u', v') uniform color space of the liquid crystal iris of the second implementation of the first embodiment of the invention with and without the use of a first color trimming device.

The following example illustrates the use of a single color trimming device composed of a VAN liquid crystal device with 4.8 μm cell gap and 0.2% concentration of the yellow dye G-470. For this example, the liquid crystal devices of the iris are also VAN liquid crystal devices. FIG. 18 shows the simulated u', v' color coordinates on the 1976 CIE uniform color space for unit f-stop settings varying from f/2 to f/8, comparing the case with no color trimming device to the case with the single VAN first color trimming device. Referring to FIG. 18, with color trimming, the color differences between low f-stop numbers are significantly less than those without color trimming, and the colors are much closer to the standard white point D55. For this example, the table below shows the color trim voltage, $V_1$, and the iris drive voltage, V, required to achieve the color coordinates of the f-stop settings given in FIG. 18.

| Drive voltages for first color trimming device, $V_1$, and iris liquid crystal devices, V, required to achieve optimum achromatic color for f-stop settings shown. | | |
| --- | --- | --- |
| f/# | $V_1$ (volts) | V (volts) |
| f/2 | 0.00 | 3.50 |
| f/3 | 3.13 | 2.85 |
| f/4 | 5.07 | 2.59 |
| f/5 | 7.11 | 2.44 |
| f/6 | 7.11 | 2.34 |
| f/7 | 7.11 | 2.25 |
| f/8 | 7.11 | 2.19 |

Figure 19:
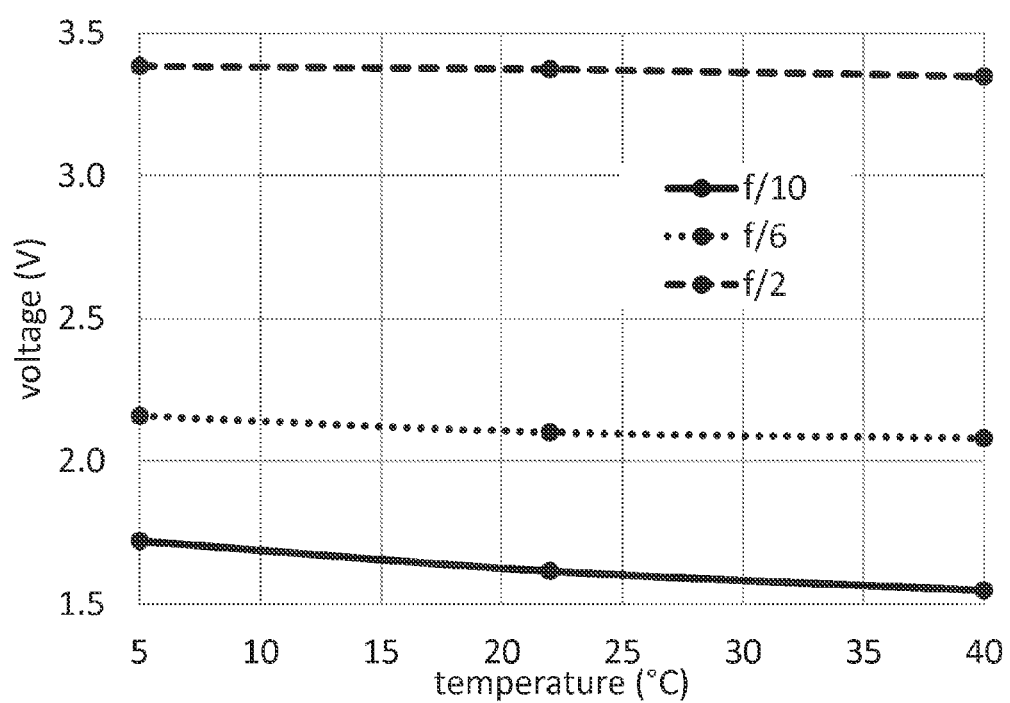
FIG. 19 shows the adjustment of the drive voltage required to maintain constant f-stop settings of f/2, f/6, and f/10 for the second implementation of the first embodiment of FIG. 9.

The material constants of liquid crystals, such as elastic constant, dielectric constants, and refractive indices, are known to be temperature dependent. The required voltage to achieve a given f-stop setting will, therefore, depend upon the temperature of the liquid crystal camera iris. FIG. 19 shows the temperature dependence of the drive voltages required to maintain f-stop settings of f/2, f/6, and f/10 over a temperature range of 5° C. to 40° C. The data for FIG. 19 were taken from measurements on the second implementation of the first embodiment with negative dielectric anisotropy liquid crystal, although f-stop settings from other examples and embodiments of the disclosed liquid crystal camera iris would also be expected to show temperature dependent drive voltages. It is possible to automatically adjust the drive voltages for this temperature dependence by installing a temperature sensor at or near the iris location to send temperature information to a control circuit that will appropriately adjust the drive voltage. This could be accomplished, for example, with thermistor placed at the iris and a look-up table implemented in the drive voltage control circuit.

Figure 20:
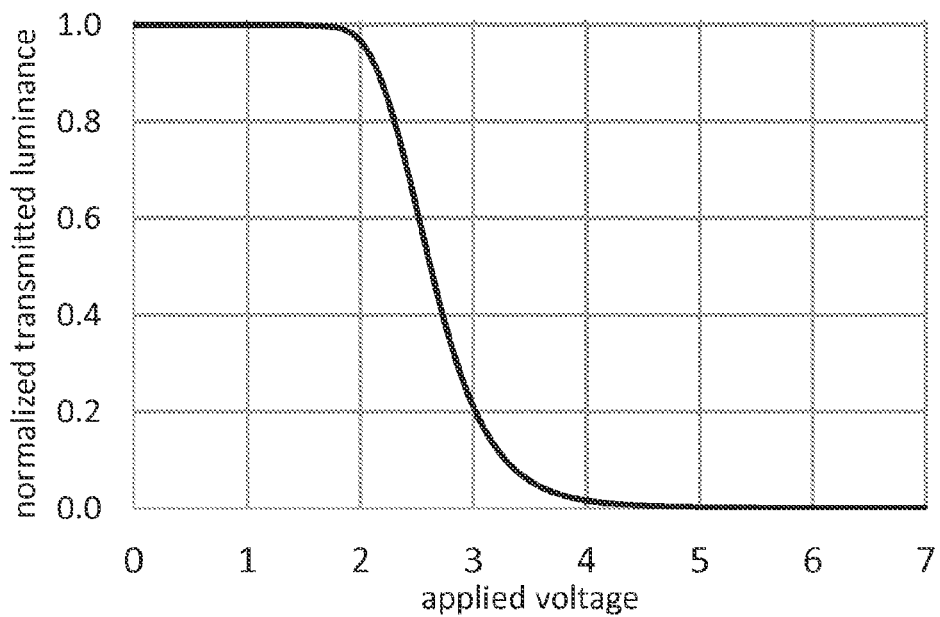
FIG. 20 is a simulated normalized transmitted luminance electro-optic curve of a second embodiment of the disclosed electro-optic liquid crystal camera iris, showing the normalized transmitted luminance as a function of applied voltage.

FIG. 20 shows a simulated transmitted luminance electro-optic curve of an example of the second embodiment of the disclosed electro-optic liquid crystal camera iris. The construction of the second embodiment is the same as that of liquid crystal iris 10 shown in FIG. 5, except as described below. The director fields of the liquid crystal devices of the second embodiment differ from the director fields 16 and 20 of ECB liquid crystal devices 12 and 14, and from director fields 16''' and 20''' of ECB liquid crystal devices 12''' and 14''', of the first embodiment. The liquid crystal devices and their associated director fields of the second embodiment are, therefore, indicated by corresponding reference numerals followed by primes. The liquid crystal MLC-7030 ($\Delta n=0.1126$) is used in the simulation, and the cell gap of each of liquid crystal devices 12' and 14' is set at 3.07 μm so that the product of cell gap, d, times the birefringence of the liquid crystal, $\Delta n$, is approximately given by the formula $\Delta n \cdot d/\lambda = 0.629$, where $\lambda$ is the design wavelength of 550 nm. The pretilt angle is 3°. Liquid crystal device 12' has a layer twist angle of 60° along the cell thickness dimension from alignment surface $30_1'$ to alignment surface $30_2'$. Liquid crystal device 14' has a layer twist angle of −60° along the cell thickness dimension from alignment surface $38_1'$ to alignment surface $38_2'$. The twist angle of liquid crystal device 14' is of opposite twist or rotational sense to that of liquid crystal device 12' because director field 20' in liquid crystal device 14' is a mirror image of director field 16' in liquid crystal device 12'. Liquid crystal devices 12' and 14' are placed together so that azimuthal directions 42' of surface-contacting directors $18c'$ and $22c'$ at the adjoining or confronting surfaces of substrate plates $24_2'$ and $32_1'$ of the respective liquid crystal devices 12' and 14' are in parallel alignment. (Because of the 60°-twist angle, azimuthal directions 42' represent the projections of surface-contacting directors $18c'$ and $22c'$ on the surfaces of substrate plates $24_2'$ and $32_1'$, respectively.) In the second embodiment, the input polarization direction is set to approximately bisect the angular distance between azimuthal directions 40' and 42' of surface-contacting directors $18c$ at the respective alignment surfaces $30_1'$ and $30_2'$ of liquid crystal device 12'. The normalized transmitted luminance is 50% for an applied voltage of 2.61V, and the normalized transmitted luminance at 6.63V is 0.1%, thereby resulting in a contrast ratio of 1,000. The second embodiment requires no external retardation to achieve a high contrast ratio.

Figure 21:
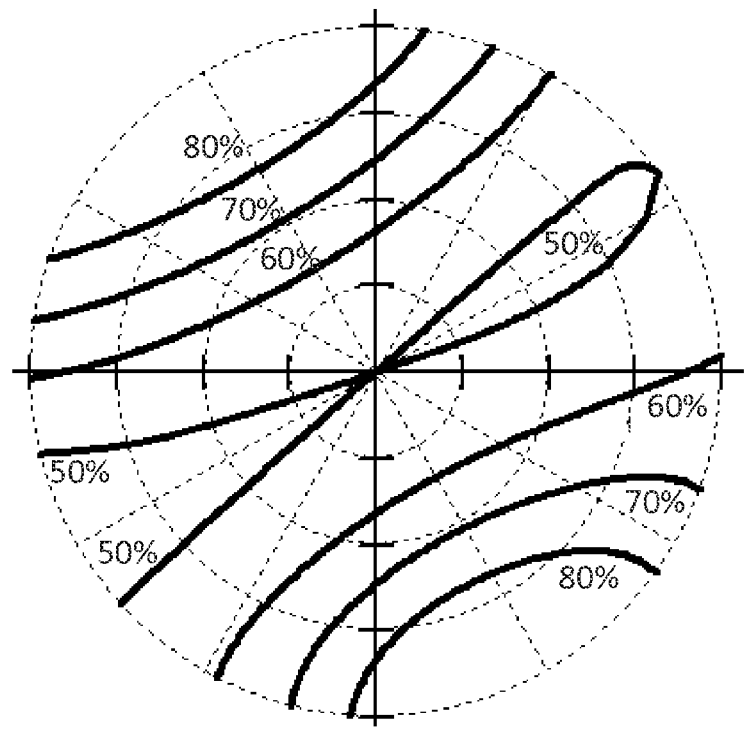
FIG. 21 shows a simulated normalized iso-transmitted luminance polar contour diagram of the camera iris according the second embodiment, with the drive voltage adjusted to give 50% normalized transmitted luminance for normally incident light.

FIG. 21 shows the viewing angle dependence of the normalized transmitted luminance under application of a drive voltage of 2.61V, which produces 50% normalized transmitted luminance at normal incidence. These data are presented in FIG. 21 in the form of a normalized iso-transmitted luminance polar contour diagram. Comparing FIG. 21 with FIG. 2 for the prior art TN iris, it is apparent that there is remarkably less angular variation in transmitted luminance. The liquid crystal iris of the second embodiment is eminently suitable for use as a camera iris because it can achieve a high contrast ratio and exhibits capability to maintain a uniform gray level over a wide range of light input angles.

Figure 22:
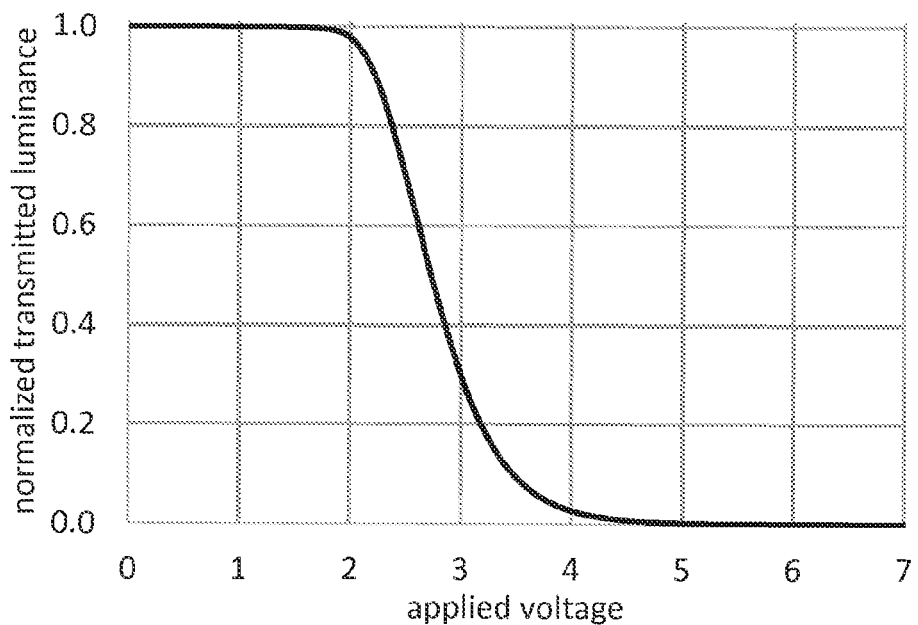
FIG. 22 is a simulated normalized transmitted luminance electro-optic curve of a third embodiment of the disclosed electro-optic liquid crystal camera iris, showing the normalized transmitted luminance as a function of the applied voltage.

FIG. 22 shows a simulated transmitted luminance electro-optic curve of an example of a third embodiment of the disclosed electro-optic liquid crystal camera iris. The construction of the third embodiment is the same as that of liquid crystal iris 10 shown in FIG. 5, except as described below. The director fields of the liquid crystal devices of the third embodiment differ from director fields 16 and 20 of ECB liquid crystal devices 12 and 14, and from director fields 16''' and 20''' of liquid crystal devices 12''' and 14''', of the first embodiment. The liquid crystal devices and their associated director fields of the third embodiment are, therefore, indicated by corresponding reference numerals followed by double primes. The liquid crystal MLC-7030 ($\Delta n=0.1126$) is used in the simulation, and the cell gap of each of liquid crystal devices 12" and 14" is set at 2.18 μm so that the product of cell gap, d, times the birefringence of the liquid crystal, $\Delta n$, is approximately given by the formula $\Delta n \cdot d/\lambda = 0.447$, where $\lambda$ is the design wavelength of 550 nm. The pretilt angle is 3°. Liquid crystal device 12" has a layer twist angle of 90° along the cell thickness dimension from alignment surface $30_1"$ to alignment surface $30_2"$. Liquid crystal device 14" has a layer twist angle of −90° along the cell thickness dimension from alignment surface $38_1"$ to alignment surface $38_2"$. The twist angle of liquid crystal device 14" is of opposite twist sense to that of liquid crystal device 12" because director field 20" of liquid crystal device 14" is a mirror image of director field 16" of liquid crystal device 12". Liquid crystal devices 12" and 14" are placed together so that azimuthal directions 42" of surface-contacting directors $18c"$ and $22c"$ at the adjoining or confronting surfaces of substrate plates $24_2"$ and $32_1"$ of the respective liquid crystal devices 12" and 14" are in parallel alignment. (Because of the 90°-twist angle, azimuthal directions 42" represent the projections of surface-contacting directors $18c"$ and $22c"$ on the surfaces of substrate plates $24_2"$ and $32_1"$, respectively.) In the third embodiment, the input polarization direction is set to approximately 20° with respect to azimuthal direction 40" of surface-contacting directors $18c"$ at light input surface 52" of liquid crystal device 12". The normalized transmitted luminance is 50% for an applied voltage of 2.69V, and the normalized transmitted luminance at 6.63V is 0.1%, thereby resulting in a contrast ratio of 1,000, The third embodiment requires no external retardation to achieve a high contract ratio.

Figure 23:
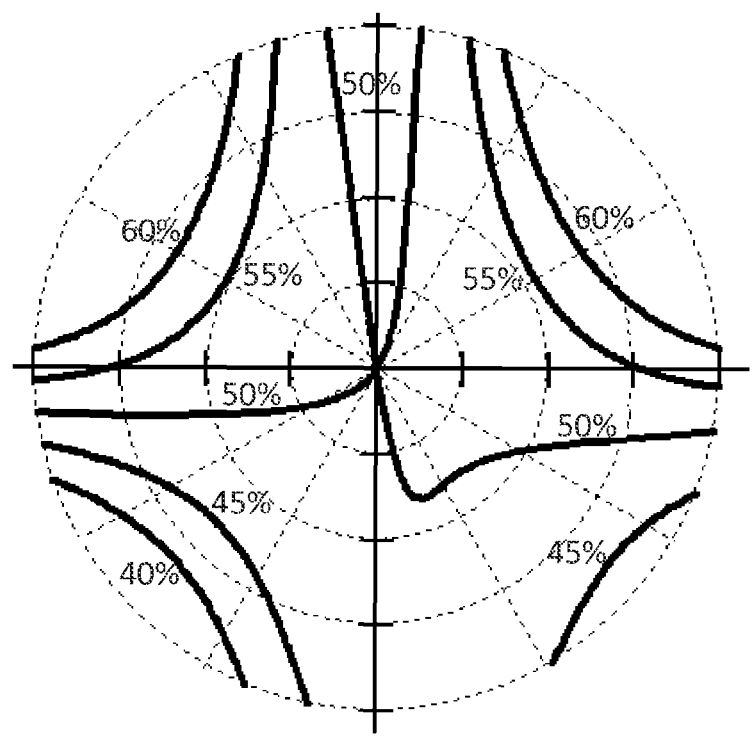
FIG. 23 shows the normalized iso-transmitted luminance polar contour diagram of the camera iris according the third embodiment, with the drive voltage adjusted to give 50% normalized transmitted luminance for normally incident light.

FIG. 23 shows the viewing angle dependence of the normalized transmitted luminance under application of a drive voltage of 2.69V, which gives 50% transmitted luminance at normal incidence. These data are presented in FIG. 23 in the form of a normalized iso-transmitted luminance polar contour diagram. Comparing FIG. 23 with FIG. 2 for the prior art TN iris, it is apparent that there is remarkably improved uniformity of the angular dependence of the 50% gray level. The liquid crystal iris device of the third embodiment is eminently suitable for use as a camera iris because it can achieve a high contrast ratio and exhibits capability to maintain a uniform gray level over a wide range of light input angles.

Figure 24:
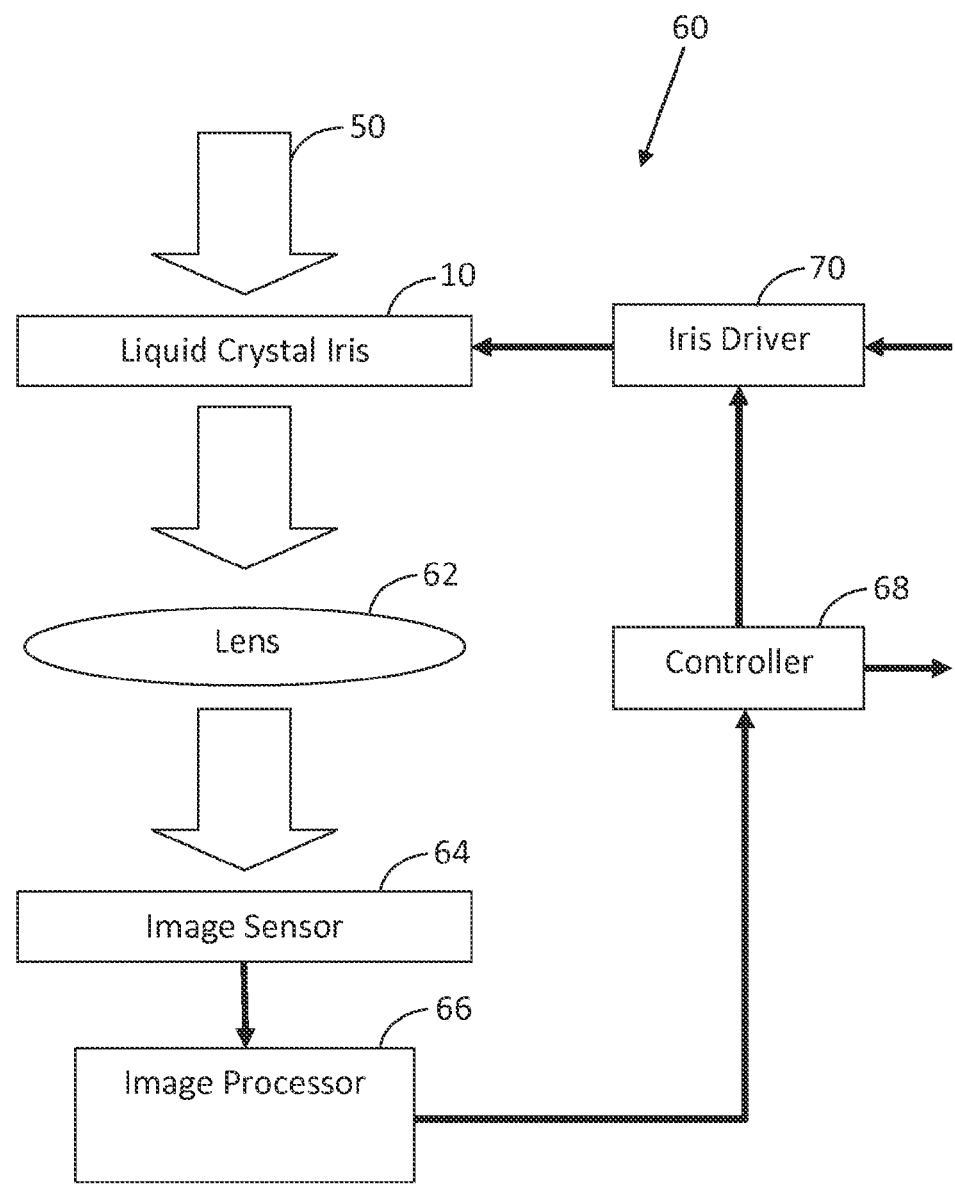
FIG. 24 is a block diagram showing one example of a camera module implemented with the disclosed liquid crystal iris.

FIG. 24 is a block diagram of an example of a camera module 60 that includes the liquid crystal iris of any of the three embodiments of the disclosed electro-optic liquid crystal camera iris. FIG. 24 shows liquid crystal iris 10 of the first embodiment for purposes of convenience. Camera module 60 includes optical components of miniature sizes that can fit within a smart phone housing and provide full motion video and still photographs. Incoming light 50 entering camera module 60 is incident on liquid crystal iris 10, which controls the amount of light passing through it. A lens 62, which is illustrated as a single component but could be a compound lens assembly, collects the light and focuses the image onto an image sensor 64 of, for example, a CCD or CMOS type. An image processor 66 processes the image data and sends image information to a controller 68, which exports the image to memory, a liquid crystal display screen, or other storage or display medium. Controller 68 also sends image information to an iris driver 70, which then applies the appropriate signals to liquid crystal iris 10 to control the amount of light reaching image sensor 64. Control signals can also be applied directly to iris driver 70.

It will be obvious to those having skill in the art that many changes may be made to the details of the above-described embodiments without departing from the underlying principles thereof. For example, optically transparent electrodes 26₁ and 26₂ of liquid crystal device 12 and optically transparent electrodes 34₁ and 34₂ of liquid crystal device 14 can be patterned into concentric rings to produce an adjustable depth of field. This alternative is applicable also to the other embodiments described. Moreover, for liquid crystal device 12, the value of angle α made by surface-contacting directors 18c with alignment surface 30₁ need not be equal to the value of angle α made by surface-contacting directors 18c with alignment surface 30₂; and, for liquid crystal device 14, the value of angle α made by surface-contacting directors 22c with alignment surface 38₁ need not be equal to the value of angle α made by surface-contacting directors 22c with alignment surface 38₂. This alternative is applicable also to the other embodiments described. The scope of the present invention should, therefore, be determined only by the following claims.

The invention claimed is:

1. A high-contrast electro-optic liquid crystal camera iris providing angle independent transmission of incident light for uniform gray shades, comprising:
   first and second light polarizing filters;
   a first liquid crystal device including a spaced-apart pair of first electrode structures and a second liquid crystal device including a spaced-apart pair of second electrode structures, each of the first and second liquid crystal devices is a quasi-homeotropically oriented electrically controlled birefringence (ECB) device containing liquid crystal with negative dielectric anisotropy, and the first and second liquid crystal devices positioned between the first and second light polarizing filters and arranged in optical series so that a surface of one of the first electrode structures adjoins or confronts a surface of one of the second electrode structures to form an interface between the first and second liquid crystal devices, the interface characterized by substantially no selective polarization state blocking of incident light propagating from one to the other of the adjoining or confronting surfaces of the first and second electrode structures;
   the first liquid crystal device having spaced-apart first alignment surfaces which are formed on interior surfaces of the first electrode structures and between which are confined first liquid crystal directors, the first liquid crystal directors forming a first director field and including first surface-contacting directors that contact, and define an azimuthal direction on, each of the first alignment surfaces;
   the second liquid crystal device having spaced-apart second alignment surfaces which are formed on interior surfaces of the second electrode structures and between which are confined second liquid crystal directors, the second liquid crystal directors forming a second director field and including second surface-contacting directors that contact, and define an azimuthal direction on, each of the second alignment surfaces;
   one of the first and second director fields being a mirror image of the other of the first and second director fields;
   the azimuthal directions defined on the first and second alignment surfaces formed on respective ones of the adjoined or confronting first and second electrode structures being in parallel alignment; and
   an optical retarder positioned between the first liquid crystal device and the first light polarizer.

2. The liquid crystal iris of claim 1, in which the first light polarizing filter receives incoming light for successive propagation through the first liquid crystal device and the second liquid crystal device, and in which the second light polarizing filter receives light exiting the second liquid crystal device.

3. The liquid crystal iris of claim 2, in which the optical retarder includes a biaxial retarder.

4. The liquid crystal iris of claim 2, in which the optical retarder includes an A plate retarder, and further comprising a negative C plate retarder positioned in combination with the A plate retarder.

5. The liquid crystal iris of claim 1, in which the second light polarizing filter receives incoming light for successive propagation through the second liquid crystal device and the first liquid crystal device, and in which the first light polarizing filter receives light exiting the first liquid crystal device.

6. The liquid crystal iris of claim 5, in which the optical retarder includes a biaxial retarder.

7. The liquid crystal iris of claim 5, in which the optical retarder includes an A plate retarder, and further comprising a negative C plate retarder positioned in combination with the A plate retarder.

8. The liquid crystal iris of claim 1, in which the optical retarder constitutes a first optical retarder, and further comprising a second optical retarder positioned between the second liquid crystal device and the second light polarizer.

9. The liquid crystal iris of claim 8, in which the first and second optical retarders include, respectively, first and second biaxial retarders.

10. The liquid crystal iris of claim 8, in which one of the first and second optical retarders includes an A plate retarder and the other one of the first and second optical retarders includes a negative C plate retarder.

11. The liquid crystal iris of claim 1, in which the optical retarder includes an A plate retarder, and further comprising a negative C plate retarder positioned between the first liquid crystal device and second liquid crystal device.

* * * * *